United States Patent
Huang

(10) Patent No.: US 10,970,604 B2
(45) Date of Patent: Apr. 6, 2021

(54) FUSION-BASED CLASSIFIER, CLASSIFICATION METHOD, AND CLASSIFICATION SYSTEM

(71) Applicant: Industrial Technology Research Institute, Hsinchu (TW)

(72) Inventor: Mao-Yu Huang, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 182 days.

(21) Appl. No.: 16/211,240

(22) Filed: Dec. 6, 2018

(65) Prior Publication Data
US 2020/0104650 A1    Apr. 2, 2020

(30) Foreign Application Priority Data
Sep. 27, 2018  (TW) .................. 107134040

(51) Int. Cl.
| | |
|---|---|
| G06K 9/62 | (2006.01) |
| G06N 3/08 | (2006.01) |
| G06N 3/04 | (2006.01) |
| G06N 7/00 | (2006.01) |

(Continued)

(52) U.S. Cl.
CPC ......... *G06K 9/6289* (2013.01); *G06K 9/4628* (2013.01); *G06K 9/6262* (2013.01); *G06K 9/6277* (2013.01); *G06K 9/6292* (2013.01); *G06N 3/0472* (2013.01); *G06N 3/088* (2013.01); *G06N 7/005* (2013.01); *G06N 20/10* (2019.01); *G06N 3/0445* (2013.01)

(58) Field of Classification Search
None
See application file for complete search history.

(56) References Cited

U.S. PATENT DOCUMENTS

| | | |
|---|---|---|
| 7,505,621 B1 | 3/2009 | Agrawal et al. |
| 8,429,070 B2 | 4/2013 | Hu et al. |
| 8,694,267 B2 | 4/2014 | Sunshine et al. |

(Continued)

FOREIGN PATENT DOCUMENTS

| | | |
|---|---|---|
| AU | 2016322918 | 4/2018 |
| CA | 2649731 | 5/2010 |

(Continued)

OTHER PUBLICATIONS

Oh et al., "Object Detection and Classification by Decision-Level Fusion for Intelligent Vehicle Systems," Sensors, 17, 1, Jan. 2017, pp. 1-21.

(Continued)

*Primary Examiner* — Kim Y Vu
*Assistant Examiner* — Nathan J Bloom
(74) *Attorney, Agent, or Firm* — JCIPRNET

(57) ABSTRACT

A fusion-based classifier, classification method, and classification system, wherein the classification method includes: generating a plurality of probability vectors according to input data, wherein each of the plurality of probability vectors includes a plurality of elements corresponding to a plurality of class respectively; selecting, from the plurality of probability vectors, a first probability vector having an extremum value corresponding to a first class-of-interest according to the first class-of-interest; and determining a class of the input data according to the first probability vector.

21 Claims, 16 Drawing Sheets

(51) Int. Cl.
  *G06K 9/46* (2006.01)
  *G06N 20/10* (2019.01)

(56) References Cited

U.S. PATENT DOCUMENTS

| | | | |
|---|---|---|---|
| 9,830,709 B2 | 11/2017 | Li et al. | |
| 9,996,890 B1* | 6/2018 | Cinnamon | G06T 1/0007 |
| 2002/0122596 A1* | 9/2002 | Bradshaw | G06K 9/685 |
| | | | 382/226 |
| 2003/0164792 A1* | 9/2003 | Jahangir | G01S 7/415 |
| | | | 342/90 |
| 2006/0036372 A1 | 2/2006 | Yener et al. | |
| 2009/0018940 A1 | 1/2009 | Wang et al. | |
| 2009/0208118 A1* | 8/2009 | Csurka | H04N 1/3873 |
| | | | 382/228 |
| 2009/0327195 A1 | 12/2009 | Iscen | |
| 2010/0190656 A1 | 7/2010 | Li et al. | |
| 2011/0282778 A1 | 11/2011 | Wright et al. | |
| 2012/0106854 A1* | 5/2012 | Tang | G06K 9/6292 |
| | | | 382/224 |
| 2014/0355879 A1* | 12/2014 | Agosta | G06T 7/143 |
| | | | 382/170 |
| 2015/0063688 A1* | 3/2015 | Bhardwaj | G06K 9/3258 |
| | | | 382/159 |
| 2015/0121532 A1 | 4/2015 | Barel | |
| 2015/0347871 A1 | 12/2015 | Sathyendra et al. | |
| 2018/0012092 A1 | 1/2018 | Gleeson-May et al. | |
| 2018/0039888 A1 | 2/2018 | Ge et al. | |
| 2018/0181881 A1* | 6/2018 | Du | G06K 9/6256 |
| 2018/0276845 A1* | 9/2018 | Bjorgvinsdottir | G06K 9/6265 |
| 2018/0307936 A1* | 10/2018 | Kolouri | G06N 3/084 |
| 2019/0065856 A1* | 2/2019 | Harris | G06K 9/6257 |
| 2019/0073553 A1* | 3/2019 | Yao | G06N 3/08 |
| 2019/0102601 A1* | 4/2019 | Karpas | G06N 3/084 |
| 2019/0213448 A1* | 7/2019 | Peng | G06K 9/6262 |
| 2020/0090028 A1* | 3/2020 | Huang | G06K 9/6267 |

FOREIGN PATENT DOCUMENTS

| | | |
|---|---|---|
| CN | 1690077 | 11/2005 |
| CN | 1926551 | 3/2007 |
| CN | 101278303 | 10/2008 |
| CN | 100475842 | 4/2009 |
| CN | 101589308 | 11/2009 |
| CN | 102105791 | 6/2011 |
| CN | 102439168 | 5/2012 |
| CN | 102924601 | 2/2013 |
| CN | 103336906 | 10/2013 |
| CN | 103345593 | 10/2013 |
| CN | 103649330 | 3/2014 |
| CN | 103710430 | 4/2014 |
| CN | 105102986 | 11/2015 |
| CN | 105209636 | 12/2015 |
| CN | 105886521 | 8/2016 |
| CN | 106951735 | 7/2017 |
| CN | 106991472 | 7/2017 |
| CN | 107016683 | 8/2017 |
| CN | 107220616 | 9/2017 |
| CN | 107564580 | 1/2018 |
| CN | 107730497 | 2/2018 |
| CN | 108009525 | 5/2018 |
| EP | 1599602 | 11/2005 |
| EP | 2610636 | 7/2013 |
| JP | 2008289482 | 12/2008 |
| JP | 4568500 | 10/2010 |
| JP | 4981925 | 7/2012 |
| JP | 5053497 | 10/2012 |
| JP | 5734947 | 6/2015 |
| JP | 2016138111 | 8/2016 |
| KR | 20110050072 | 5/2011 |
| KR | 1139731 | 6/2012 |
| KR | 20160065876 | 6/2016 |
| TW | 201732690 | 9/2017 |
| WO | 2006073440 | 7/2006 |

OTHER PUBLICATIONS

Hu et al, "FusioNet: A two-stream convolutional neural network for urban scene classification using PolSAR and hyperspectral data," 2017 Joint Urban Remote Sensing Event (JURSE), IEEE, Mar. 2017, pp. 1-4.

Wang et al, "Deeply-fused nets," arXiv preprint,1605.07716, May 2016, pp. 1-16.

Zhao et al, "On the Connection of Deep Fusion to Ensembling," arXiv preprint,1611.07718, Nov. 2016, pp. 1-12.

Wu et al, "Multi-stream multi-class fusion of deep networks for video classification," Proceedings of the 24th ACM International conference on Multimedia, Oct. 2016, pp. 791-800.

Fauvel et al, "Decision fusion for hyperspectral classification," John Wiley & Sons, New York, NY, USA, 2007, pp. 1-28.

"Office Action of Taiwan Counterpart Application", dated Mar. 11, 2020, p. 1-p. 3.

* cited by examiner

FUSION-BASED CLASSIFIER, CLASSIFICATION METHOD, AND CLASSIFICATION SYSTEM

CROSS REFERENCE TO RELATED APPLICATION

This application claims the priority benefit of Taiwan application serial no. 107134040, filed on Sep. 27, 2018. The entirety of the above-mentioned patent application is hereby incorporated by reference herein and made a part of specification.

BACKGROUND

Technical Field

The disclosure relates to a fusion-based classifier, a classification method, and a classification system.

Description of Related Art

In the course of industrial production (such as the production of wafers and other products), there may be many types of defects. In order to detect these defects from the appearance, image recognition technology is widely used. At present, neural network (NN) has become one of the mainstream methods in the field of image recognition. A neural network is a computational model that mimics the structure and function of a biological neural network. A trained neural network may identify the different types of defects that a product has from a wide range of defects, thus helping to improve the efficiency of the operator's detection.

Different types of defects are not of the same importance. The defects of some classes may cause particularly serious damage to the product. Therefore, the miss rate (or false negative rate, FNR) of these defects must be reduced as much as possible. On the other hand, the defects of some classes have a lower impact on the product, so the precision rate (or positive predictive rate, PPV) for predicting the types of these defects must be increased as much as possible to reduce the labor cost of the quality control. However, current research on neural networks tends to focus on reducing the overall error rate, but it cannot effectively solve the above problems. Based on the above, an improved classifier needs to be proposed.

SUMMARY

The disclosure provides a fusion-based classifier, including: a sub-classifier, a fusion layer, and an output layer. The sub-classifier generates a plurality of probability vectors according to input data, wherein each of the plurality of probability vectors includes a plurality of elements respectively corresponding to a plurality of classes. The fusion layer selects a first probability vector having an extremum value corresponding to a first class-of-interest from the plurality of probability vectors according to the first class-of-interest. An output layer determines a class of the input data according to the first probability vector.

The disclosure provides a classification method based on probability fusion, including: generating a plurality of probability vectors according to input data, wherein each of the plurality of probability vectors includes a plurality of elements respectively corresponding to a plurality of classes; selecting a first probability vector having an extremum value corresponding to a first class-of-interest from the plurality of probability vectors according to the first class-of-interest; and determining a class of the input data according to the first probability vector.

The disclosure provides a classification system based on probability fusion, including: an automatic optical detection device and a processor. The automatic optical inspection device obtains image data of an article. The processor is configured to control a classifier, and the classifier includes: a sub-classifier, a fusion layer, and an output layer. The sub-classifier generates a plurality of probability vectors according to the image data, wherein each of the plurality of probability vectors includes a plurality of elements corresponding to a plurality of classes. The fusion layer selects a first probability vector having an extremum value corresponding to a first class-of-interest from the plurality of probability vectors according to the first class-of-interest. The output layer determines a class of an appearance defect according to the first probability vector.

The above described features and advantages of the disclosure will be more apparent from the following description.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
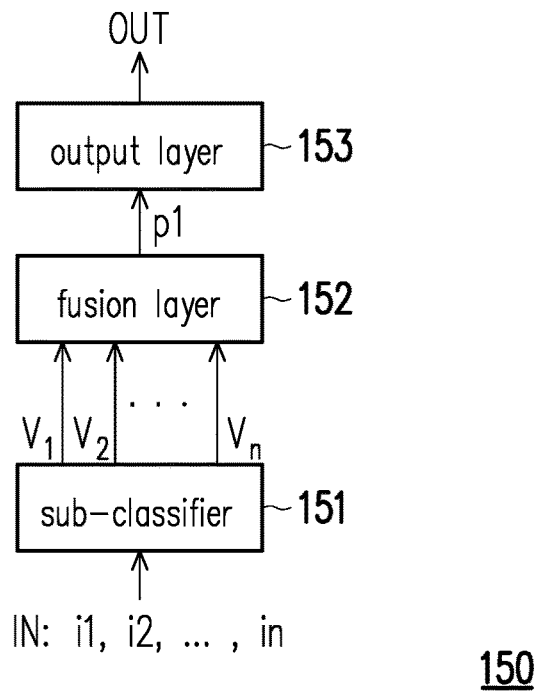
FIGS. 1A and 1B are schematic diagrams of a fusion-based classifier according to an embodiment of the disclosure.

FIG. 1A is schematic diagrams of a fusion-based classifier 150 according to an embodiment of the disclosure, wherein the classifier 150 is adapted to classify input data into one of a plurality of classes, and the classifier 150 may be implemented by a hardware (e.g.: a circuit or an integrated circuit) or a software (e.g.: one or more modules stored in a storage medium), and the disclosure is not limited thereto.

The classifier 150 may include a sub-classifier 151, a fusion layer 152, and an output layer 153. In this embodiment, it is assumed that input data IN includes n pieces of data such as data i1, data i2, . . . , and data in. The sub-classifier 151 generates a plurality of probability vectors v1, v2, . . . , and vn according to the input data IN. Specifically, the sub-classifier 151 may receive the data i1 and classify the data i1 to generate a score vector corresponding to the data i1. The size of the score vector depends on the number of classes that the classifier 150 may discern. Assuming the classifier 150 may classify the input data IN into one of M classes, the size of the score vector is M×1, wherein each element in the score vector represents a score value of a certain class corresponding to the data i1.

After calculating the score vector of the data i1, the sub-classifier 151 may convert the score vector into a probability vector through a softmax function. The probability vector also has M elements. Each of the M elements represents a probability value corresponding to a class of the data i1, and the probability value is between 0 and 1. After repeating the above steps, the sub-classifier 151 may generate the probability vectors v1, v2, . . . , and vn based on the data i1, the data i2, . . . , and the data in, respectively.

The input data IN may be any type of data. For example, the input data IN may include a feature map output from a convolution neural network (CNN). In some embodiments, the input data IN may also be output data of other kinds of neural networks, which may include an autoencoder neural network, a deep learning neural network, and a deep residual learning neural network, Boltzmann machine (RBM) neural network, recursive neural network or multi-layer perceptron (MLP) neural network, etc., the disclosure is not limited thereto. If the classifier 150 is used in the manufacturing of wafer fabrication, semiconductor manufacturing or printed circuit board (PCB), the input data IN may be, for example, an image data of an appearance of a wafer to be inspected obtained automatic optical inspection equipment (AOI), or an image data of an appearance of a printed circuit board obtained by automatic visual inspection (AVI) equipment, the disclosure is not limited thereto.

Figure 1B:
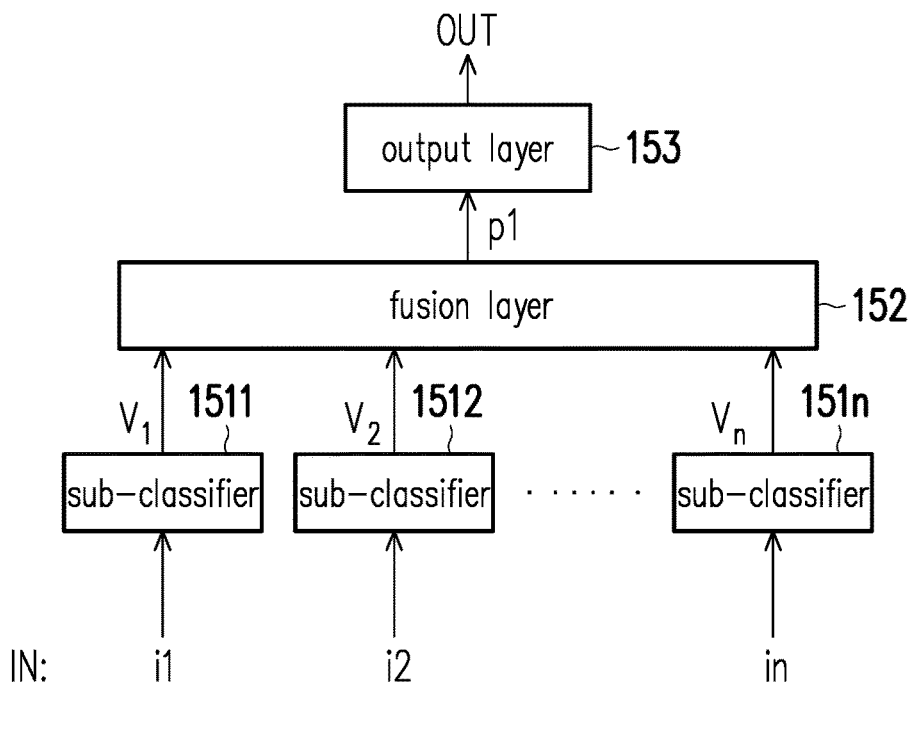

Although in the embodiment of FIG. 1A, a plurality of probability vectors v1, v2, . . . , and vn are generated by a single sub-classifier 151, the disclosure is not limited thereto. For example, the plurality of probability vectors v1, v2, . . . , and vn may also be generated by different sub-classifiers 1511, 1512, . . . , and 151n according to data i1, i2, . . . , and in in input data IN, respectively, as shown in FIG. 1B.

Returning to FIG. 1A, the fusion layer 152 may select a first probability vector p1 having an extremum value corresponding to a first class-of-interest from the plurality of probability vectors according to the first class-of-interest, wherein the first class-of-interest corresponds to one of a plurality of elements in each of the plurality of probability vectors.

Specifically, after the plurality of probability vectors v1, v2, . . . , and vn are generated in the sub-classifier 151, the fusion layer 152 may obtain an element corresponding to the first class-of-interest in each probability vector (it is assumed below that each probability vector has M elements, and each of the M elements corresponds to a different class, where element k corresponds to first class-of-interest). Next, the fusion layer 152 may select an element k having an extremum value from among n element k corresponding to n probability vectors (i.e., probability vector v1, v2, . . . , and vn), where k is one of 1 to n. The probability vector corresponding to the element k with the extremum value may be used as first probability vector p1. In the disclosure, the extremum value may represent a maximum value and a minimum value. For example, suppose the classifier 150 in FIG. 1A classifies the input data IN into one of five classes (i.e.: M=5), and the input data IN includes five pieces of data (i.e.: n=5). For the data i1, i2, i3, i4, and i5, the sub-classifier 151 may generate 5 probability vector v1, v2, v3, v4, and v5 according to the data, and the 5 probability vectors may be expressed as an example of a probability matrix of equation (1), as follows:

$$[v1 \ v2 \ v3 \ v4 \ v5] = \begin{bmatrix} 0.429032 & 0.781814 & 0.240688 & 0.209360 & 0.495072 \\ 0.000015 & 0.000000 & 0.000004 & 0.000003 & 0.000016 \\ 0.569379 & 0.218173 & 0.753031 & 0.789707 & 0.000943 \\ 0.000808 & 0.000011 & 0.006270 & 0.000875 & 0.503940 \\ 0.000766 & 0.000002 & 0.000007 & 0.000055 & 0.000029 \end{bmatrix} \quad \text{equation (1)}$$

In the equation (1), the matrix to the right of the equal sign is called the probability matrix. The element in the probability matrix is represented as where $V_{x,y}$, represents a row number in which an element V is located and an index of a class corresponding to the element V. y represents a column number in which element V is located and an index of a probability vector corresponding to the element V. For example, $V_{3,1}=0.569379$ represents a probability value of element (i.e.: $V_{3,1}$) corresponding to class 3 in the probability vector v1 is 0.569379. For another example, $V_{2,4}=0.000003$ represents a probability value of element (i.e.: $V_{2,4}$) corresponding to class 2 in the probability vector v4 is 0.000003. The representation of the remaining elements may be deduced by analogy, and will not be repeated here. In this embodiment, it is assumed that the user is interested in a class with an index of 5 in M (M=5) classes (hereinafter referred to as class 5), and the user may set class 5 as first class-of-interest (i.e.: element k=5).

Referring to equation (1), in order to reduce the miss rate of the first class-of-interest (i.e.: class 5), the fusion layer 152 may select $V_{5,1}$ having a maximum value from elements $V_{5,1}$ $V_{5,2}$, $V_{5,3}$, $V_{5,4}$ and $V_{5,5}$ according to the first class-of-interest (i.e.: k=5), and the probability vector v1 corresponding to $V_{5,1}$ is taken as the first probability vector p1. The method of converting the plurality of probability vectors (i.e.: probability vector v1, v2, v3, v4, and v5) into a first probability vector p1 by using a maximum value of a plurality of probability elements is referred to herein as class-of-interest maximum fusion (COIMax-Fusion).

The output layer 153 may output an output data OUT of a class representing the input data IN. Specifically, after obtaining the first probability vector p1 (i.e., probability vector v1), the output layer 153 may receive the first probability vector p1 and according to the first probability vector p1 to determine the class of the input data IN. In the embodiment, among the elements ($V_{1,1}$, $V_{2,1}$, $V_{3,1}$, $V_{4,1}$, and $V_{5,1}$) of the first probability vector p1 (i.e., probability vector v1), $V_{3,1}$ representing class 3 has the largest probability value ($V_{3,1}$=0.569379). Based on this, the output layer 153 may classify the input data IN into class 3. In the industry of wafer fabrication or printed circuit board manufacturing, the output data OUT outputted by the output layer 153 may be, for example, a type of appearance defect of the wafer to be inspected, or a type of appearance defect of the printed circuit board, but the disclosure is not limited thereto. Taking the wafer manufacturing industry as an example, the output data OUT may represent classes including: scratch, arrow, particle, discoloration, normal, etc. defect class. When a defect class can cause serious problems, reducing the miss rate of the defect class may effectively prevent the product having the defect of the class from flowing into the market.

Take the equation (1) as an example. In order to improve the precision rate of the first class-of-interest (i.e.: class 5), the fusion layer 152 may select $V_{5,2}$ having a minimum value from the elements $V_{5,1}$, $V_{5,2}$, $V_{5,3}$, $V_{5,4}$ and $V_{5,5}$, according to the first class-of-interest (i.e.: element k=5), and the probability vector v2 corresponding to $V_{5,2}$ is taken as the as the first probability vector p1. The method of converting the plurality of probability vectors (i.e., probability vector v1, v2, v3, v4, and v5) into a first probability vector p1 by using the minimum value of the element of the plurality of probability vectors is referred to herein as class-of-interest minimum fusion (COIMin-Fusion). In this context, COIMax-Fusion and COIMin-Fusion may be collectively referred to as class-of-interest maximum/minimum fusion (COIM-Fusion).

After obtaining the first probability vector p1 (i.e., probability vector v2), the output layer 153 may receive the first probability vector p1, and determine the class of the input data IN according to the first probability vector p1. In the embodiment, among the elements ($V_{1,2}$, $V_{2,2}$, $V_{3,2}$, $V_{4,2}$ and $V_{5,2}$) of the first probability vector p1 (i.e., probability vector v2), the class 1 has the largest probability value ($V_{1,2}$=0.781814). Based on this, the output layer 153 may classify the input data IN into class 1. Increasing the precision rate of a defect class may effectively reduce the false discovery rate (FDR) of the defect class. In this way, the number of samples of the product having the defect class may be reduced, thereby reducing the burden on the quality review personnel to perform manual re-examination of the sample.

In some embodiments, after receiving the first probability vector p1, the output layer 153 may first perform a likelihood ratio test (LRT) on the first probability vector p1, and determine the class of the input data IN according to the test result. Specifically, the output layer 153 may perform a likelihood ratio test on the first probability vector p1 according to the first class-of-interest, and classify the input data IN into a first class-of-interest according to the test result. The equation for the likelihood ratio test may be expressed as the equation (2) as follows:

$$\frac{P_k}{\max_{x \neq k} P_x} \geq \alpha \qquad \text{equation (2)}$$

In the equation (2), x represents the index of the element in the first probability vector p1 (i.e., the index of the class corresponding to the element in the first probability vector p1), and Px represents the probability that the input data IN belongs to the class x, k represents the index of the first class-of-interest, Pk represents the probability that the input data IN belongs to the first class-of-interest (x=k), and $\alpha$ is the threshold adjusted by a visual condition.

If equation (2) is true, then input data IN may be classified as the first class-of-interest. For example, if threshold $\alpha$ is set to 0.5, assuming the first probability vector p1 is probability vector v1 and index of the first class-of-interest is 5 (i.e.: k=5), then refer to the probability matrix of equation (1), equation (2) may be expressed as 0.000766/0.569379≥0.5. Since the above equation is false, it may be determined that the input data IN does not belong to the first class-of-interest (i.e.: class 5). Conversely, assuming that the first probability vector p1 is the probability vector v1 and the index of the first class-of-interest is changed to 1 (i.e., k=1), the equation (2) may be expressed as 0.429032/0.569379≥0.5. Since the above equation is true, the input data IN may be classified into the first class-of-interest (i.e.: class 1). Through the likelihood ratio test, the output layer 153 may focus on the first class-of-interest when classifying, and may improve the miss rate when classifying the first class-of-interest.

In some embodiments, after receiving the first probability vector p1, the output layer 153 may determine the class of the input data IN according to the threshold corresponding to the first class-of-interest. More specifically, the output layer 153 may test the first probability vector p1 according to the first class-of-interest and a preset threshold $\beta$ (hereinafter referred to as "threshold test" for short), and according to the test result, whether to classify the input data IN as the first class-of-interest. The equation of the threshold test may be expressed as equation (3) as follows:

$$P_k \geq \beta \qquad \text{equation (3)}$$

In the equation (3), k represents the index of the first class-of-interest, Pk represents the probability that the input data IN belongs to the first class-of-interest, and $\beta$ is the threshold adjusted by a visible condition.

If equation (3) is true, then input data IN may be classified as the first class-of-interest. For example, set threshold $\beta$ to 0.95, assuming first probability vector p1 is probability vector v1 and the index of the first class-of-interest is 5 (i.e.: k=5), then refer to the probability matrix of equation (1), equation (3) may be expressed as 0.000766≥0.95. Since the above equation is false, the input data IN does not belong to the first class-of-interest (i.e.: class 5). Conversely, if threshold β is set to 0.0005, assuming first probability vector p1 is probability vector v1 and the index of the first class-of-interest is 5 (i.e.: k=5), then equation (3) may be expressed as 0.000766≥0.0005. Since the above equation is true, the input data IN may be classified into first class-of-interest (i.e.: class 5). Through the threshold test, the output layer 153 may focus on the first class-of-interest when classifying, and may improve the precision rate when predicting the first class-of-interest.

Figure 2:
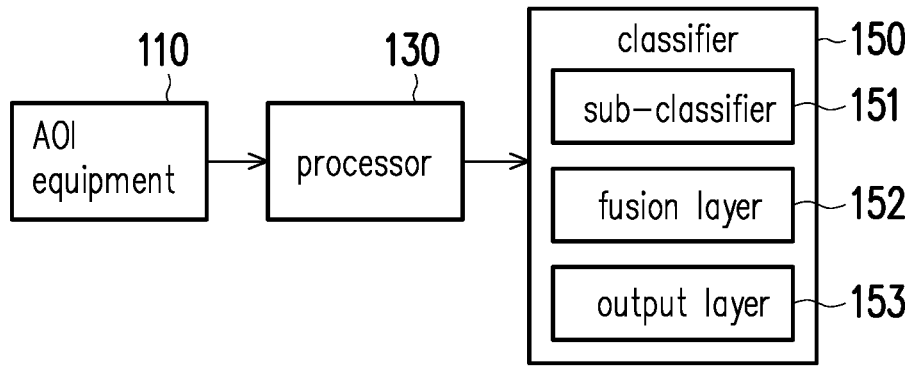
FIG. 2 is a schematic diagram of a classification system based on probability fusion according to an embodiment of the disclosure.

FIG. 2 is a schematic diagram of a classification system 10 based on probability fusion according to an embodiment of the disclosure. Classification system 10 is adapted to classifying the appearance defect of an item (e.g.: wafer) or the appearance defect of a printed circuit board into one of a variety of classes. The classification system 10 may include an automatic optical inspection equipment (or automatic visual inspection equipment) 110, a processor 130, and a classifier 150 (as shown in FIG. 1A). Automatic optical inspection (AOI) is a high-speed, high-accuracy optical image detection system that uses "mechanical vision" as an object to detect and replace human eye, brain or hand movements to detect the quality of the product or whether there are defects, etc. Automatic optical inspection technology is a non-contact detection technology that uses automatic optical inspection equipment to obtain the surface state of semi-finished or finished products (e.g.: wafers), and then uses image processing technology to detect defects such as foreign objects or pattern anomalies. Automatic optical inspection technology may improve the traditional drawbacks of using optical instruments for human detection. The automatic optical inspection equipment 110 is used to obtain image data of the appearance of a wafer or a printed circuit board. The image data may be used as the input data IN of the classifier 150.

The processor 130 is coupled to the automatic optical inspection equipment (or the automatic visual inspection equipment) 110 and the classifier 150, and may forward the image data from the automatic optical inspection equipment (or the automatic visual inspection equipment) 110 to the classifier 150. The processor 130 may be, for example, a central processing unit (CPU), or other programmable general purpose or special purpose microprocessor, digital signal processor (DSP), programmable controller, the application specific integrated circuit (ASIC) or other similar components or a combination of the above components, the disclosure is not limited thereto. The processor 130 may be used to access a plurality of modules in the storage medium.

The classifier 150 may include a sub-classifier 151, a fusion layer 152, and an output layer 153. Since the function of the classifier 150 has been disclosed in the embodiment of FIG. 1A, it will not be described herein.

Figure 3A:
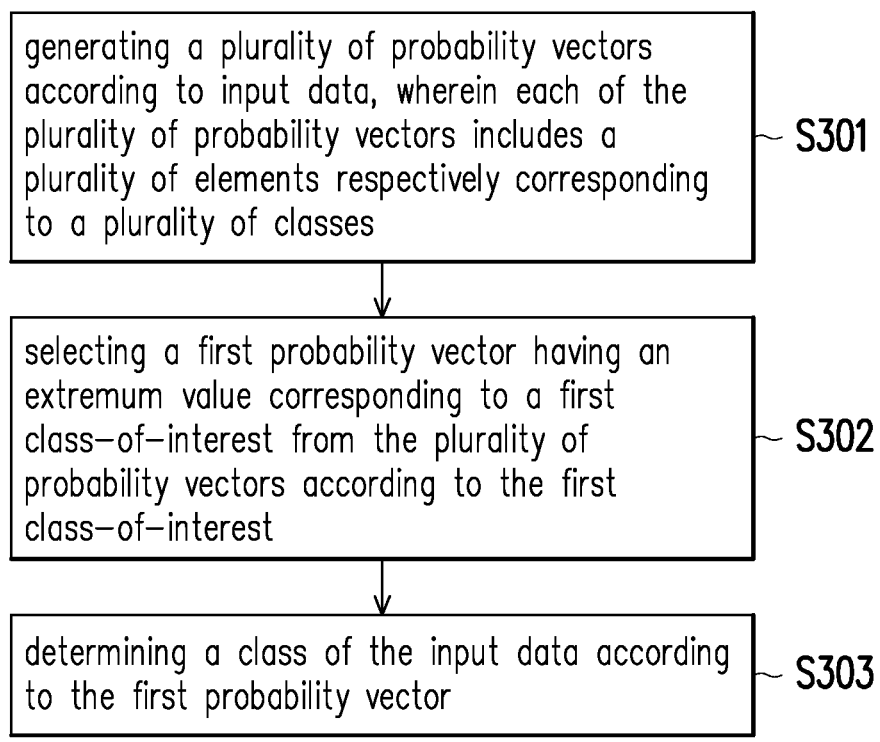
FIG. 3A is a flowchart of a classification method based on probability fusion according to an embodiment of the disclosure.

FIG. 3A is a flowchart of a classification method 300 based on probability fusion according to an embodiment of the disclosure, wherein the classification method 300 may be implemented by the classifier 150 as shown in FIG. 1A, but the disclosure is not limited thereto. In step S301, the sub-classifier 151 may generate a plurality of probability vectors v1, v2, . . . , and vn according to input data IN, wherein each of the plurality of probability vectors v1, v2, . . . , and vn includes a plurality of elements respectfully corresponding to a plurality of classes. In step S302, the fusion layer 152 may select a first probability vector p1 having an extremum value corresponding to a first class-of-interest from the plurality of probability vectors v1, v2, . . . , and vn according to the first class-of-interest. In step S303, the output layer 153 may determine a class of the input data IN according to the first probability vector p1.

Figure 3B:
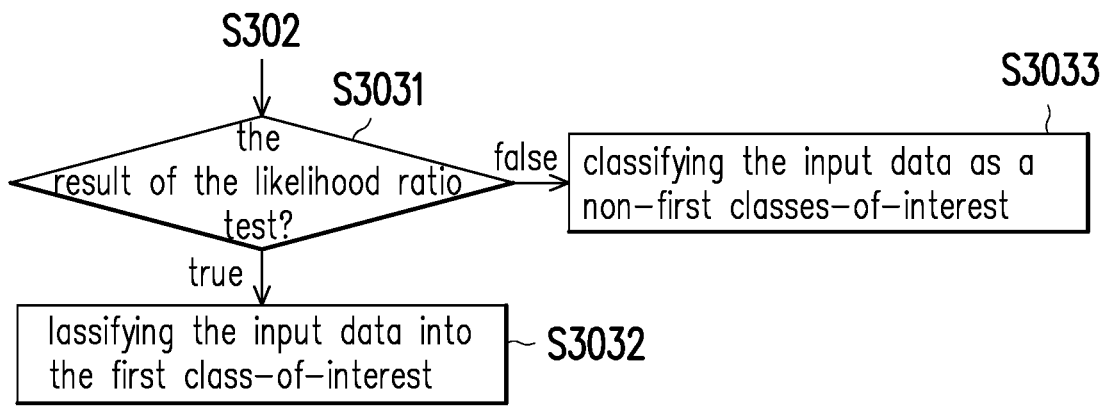
FIG. 3B further illustrates a flowchart of step S303 according to an embodiment of the disclosure.

FIG. 3B further illustrates a flowchart of step S303 according to an embodiment of the disclosure. In some embodiments, step S303 may be decomposed into step S3031, step S3032, and step S3033. In step S3031, the output layer 153 may perform a likelihood ratio test on the first probability vector p1 according to the first class-of-interest. If the result of the likelihood ratio test is true (i.e.: equation (2) is true), then the process proceeds to step S3032, and the output layer 153 classifies the input data IN into the first class-of-interest. On the other hand, if the result of the likelihood ratio test is false (i.e.: equation (2) is false), then the process proceeds to step S3033, and the output layer 153 classifies the input data IN as a non-first class-of-interest.

Figure 3C:
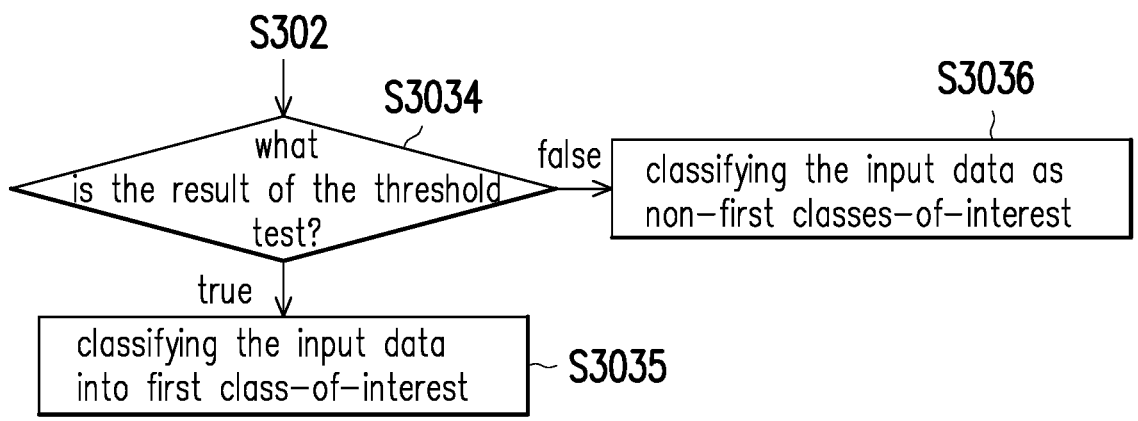
FIG. 3C further illustrates a flowchart of step S303 according to an embodiment of the disclosure.

FIG. 3C further illustrates a flowchart of step S303 according to an embodiment of the disclosure. In some embodiments, step S303 may be broken down into step S3034, step S3035, and step S3036. In step S3034, the output layer 153 may perform a threshold test on the first probability vector p1 according to the first class-of-interest and a preset threshold β. If the result of the threshold test is true (i.e.: equation (3) is true), then the process proceeds to step S3035, and the output layer 153 classifies the input data IN into the first class-of-interest. On the other hand, if the result of the threshold test is false (i.e.: equation (3) is false), then the process proceeds to step S3036, and the output layer 153 classifies the input data IN as a non-first class-of-interest.

Figure 4A:
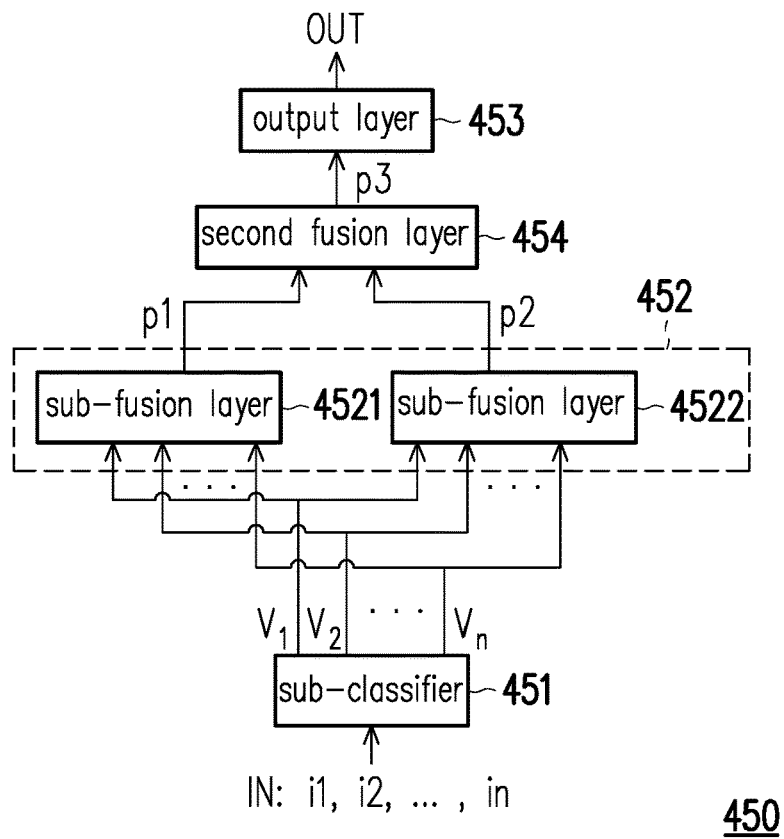
FIGS. 4A and 4B are schematic diagrams of another fusion-based classifier according to an embodiment of the disclosure.

FIG. 4A is schematic diagrams of another fusion-based classifier 450 according to an embodiment of the disclosure, wherein the classifier 450 is adapted to classify input data into one of a plurality of classes, and the classifier 450 may be implemented by a hardware (e.g.: circuit or integrated circuit) or by a software (e.g.: one or more modules stored in a storage medium), and the disclosure is not limited thereto. Classifier 450 applies when the user's class-of-interest is plural.

The classifier 450 may include a sub-classifier 451, a fusion layer 452, a second fusion layer 454, and an output layer 453. In this embodiment, it is assumed that input data IN includes n pieces of data such as data i1, data i2, . . . , and data in. The sub-classifier 451 may generate a plurality of probability vectors v1, v2, . . . , and vn according to the input data IN. The sub-classifier 451 generates a probability vector in a similar manner to the sub-classifier 151, and will not be repeated here.

Figure 4B:
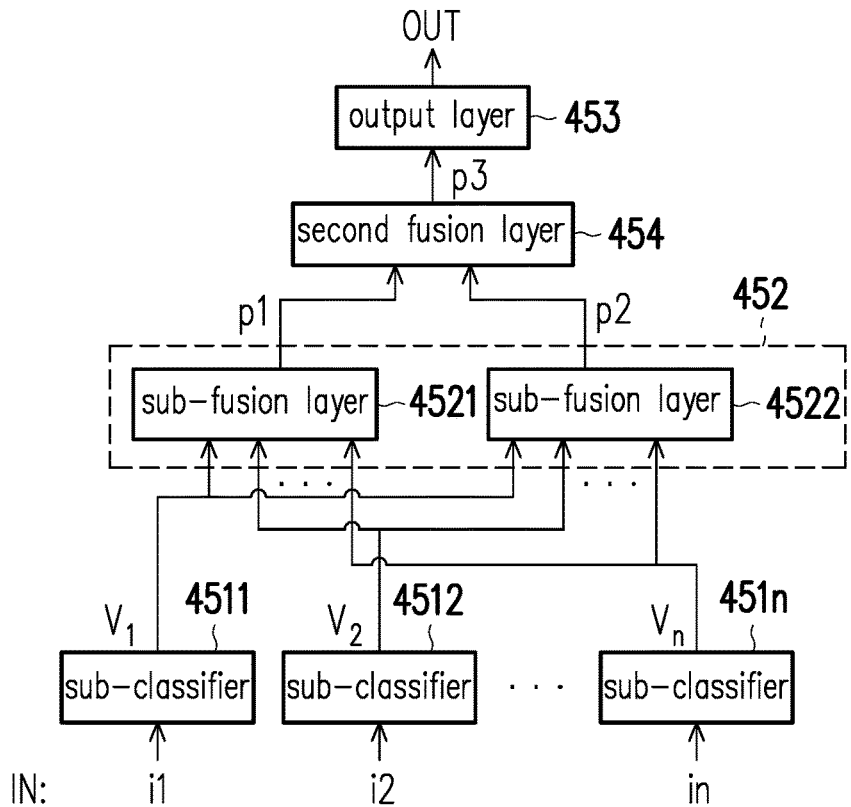

Although in the embodiment of FIG. 4A, a plurality of probability vectors v1, v2, . . . , and vn are generated by a single sub-classifier 451, the disclosure is not limited thereto. For example, the plurality of probability vectors v1, v2, . . . , and vn may also be generated by a plurality of different sub-classifiers 4511, 4512, . . . , and 451n according to the data i1, i2, . . . in in the input data IN, respectively, as shown in FIG. 4B.

Returning to FIG. 4A, the fusion layer 452 may include a sub-fusion layer 4521 and a sub-fusion layer 4522, wherein the number of sub-fusion layers may be adjusted with the number of classes-of-interest. In this embodiment, it is assumed that there are two classes-of-interest (i.e.: first class-of-interest and second class-of-interest), wherein first class-of-interest is class 5 and second class-of-interest is class 3. Accordingly, the fusion layer 452 may include two sub-fusion layers based on the number of classes-of-interest being two. The number of classes-of-interest may be adjusted to 2 or more as needed, and the disclosure is not limited thereto.

The sub-fusion layer 4521 may select a first probability vector p1 having an extremum value corresponding to the first class-of-interest from the plurality of probability vectors v1, v2, . . . , and vn according to the first class-of-interest, wherein the first class-of-interest corresponds to one of a plurality of elements in each of the plurality of probability vectors. The sub-fusion layer 4522 may select a second probability vector p2 having an extremum value corresponding to the second class-of-interest from the plurality of probability vectors v1, v2, . . . , and vn according to the second class-of-interest, wherein the second class-of-interest corresponds to one of the plurality of elements in each of the plurality of probability vectors.

Specifically, take "class-of-interest maximum fusion method (COIMax-Fusion)" as an example. Referring to the equation (1), the sub-fusion layer 4521 may select $V_{5,1}$ ($V_{5,1}$=0.000766) having the maximum value from the elements $V_{5,1}$, $V_{5,2}$, $V_{5,3}$, $V_{5,4}$ and $V_{5,5}$, according to the first class-of-interest (i.e.: k=5), and the probability vector v1 corresponding to $V_{5,1}$ is taken as the first probability vector p1. On the other hand, the sub-fusion layer 4522 may select $V_{3,4}$ ($V_{3,4}$=0.789707) having the maximum value from elements $V_{3,1}$, $V_{3,2}$, $V_{3,3}$, $V_{3,4}$ and $V_{3,5}$ according to the second class-of-interest (i.e.: k=3), and the probability vector v4 corresponding to $V_{3,4}$ is taken as a second probability vector p2.

After generating the first probability vector p1 and the second probability vector p2, the second fusion layer 454 may perform probability fusion on the first probability vector p1 and the second probability vector p2 to generate a third probability vector p3. The method of probability fusion may be used, for example, are weighted average fusion, maximum fusion or random fusion, but the disclosure is not limited thereto. Take the weighted average fusion as an example. The weighted average fusion is obtained by multiplying the first probability vector p1 and the second probability vector p2 by the respective weights to generate a third probability vector p3. For example, assume that the first probability vector p1 (i.e.: probability vector v1) corresponds to a weight of 0.6, and the second probability vector p2 (i.e.: probability vector v4) corresponds to a weight of 0.4, then the third probability vector p3 may be expressed as (v1)*0.6+v2*0.4)/(0.6+0.4)=[0.341163 0.000010 0.657510 0.000835 0.000482]$^T$.

The output layer 453 may output an output data OUT representing a class of input data IN. After obtaining the third probability vector p3, the output layer 453 may receive the third probability vector p3, and the class of the input data IN is determined according to the third probability vector p3. For example, in the embodiment, the element of the third row of the third probability vector p3 has the largest probability value (0.657510). Based on this, the output layer 453 classifies the input data IN into class 3. In the industry of wafer fabrication or printed circuit board manufacturing, the class output by the output layer 453 may be, for example, a type of appearance defect of the wafer or a type of appearance defect of the printed circuit board, but the disclosure is not limited thereto.

The user may directly apply the classifier 150 or the classifier 450 of the disclosure to the traditional neural network-based classification system, without having to adjust or retrain the parameters of the neural network or the classifier weights of the neural network. Therefore, the disclosure may reduce the miss rate of one or more classes-of-interest or improve the precision rate of one or more classes-of-interest without consuming too much time and cost.

Figure 5:
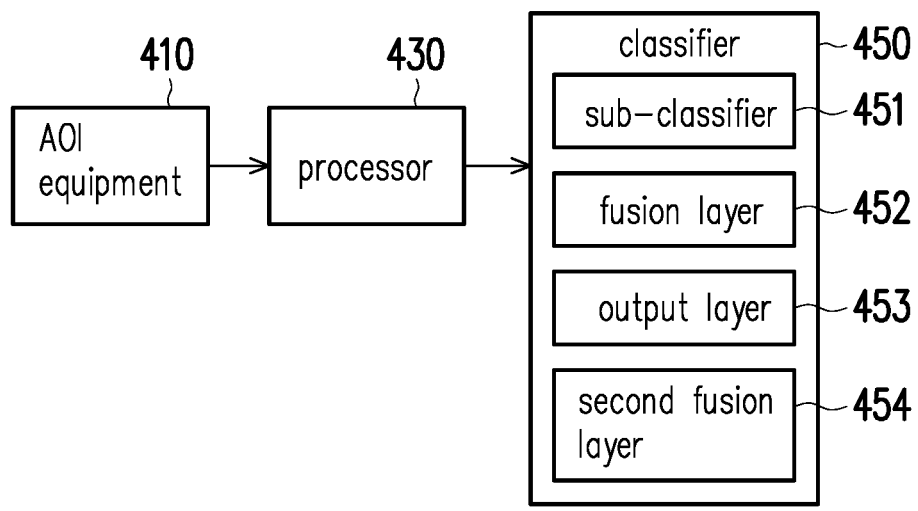
FIG. 5 is a schematic diagram of another classification system based on probability fusion according to an embodiment of the disclosure.

FIG. 5 is a schematic diagram of another classification system 40 based on probability fusion according to an embodiment of the disclosure. The classification system 40 is adapted to classifying the appearance defect of a wafer or the appearance defect of a printed circuit board into one of a variety of classes. The classification system 40 applies when the class-of-interest is plural.

The classification system 40 may include an automatic optical inspection equipment (or automatic visual inspection equipment) 410, a processor 430, and a classifier 450 (shown in FIG. 4A) having functions similar to an automatic optical inspection equipment 110, a processor 130, and a classifier 150, wherein the difference between the classifier 150 and the classifier 450 is that the classifier 450 includes, in addition to the sub-classifier 451, the fusion layer 452 (the fusion layer 452 including the sub-fusion layer 4521 and the sub-fusion layer 4522) and the output layer 453, a second fusion layer 454 for the probability fusion on the first probability vector p1 and the second probability vector p2. The function of the second fusion layer 454 is as described above, and will not be repeated herein.

Figure 6A:
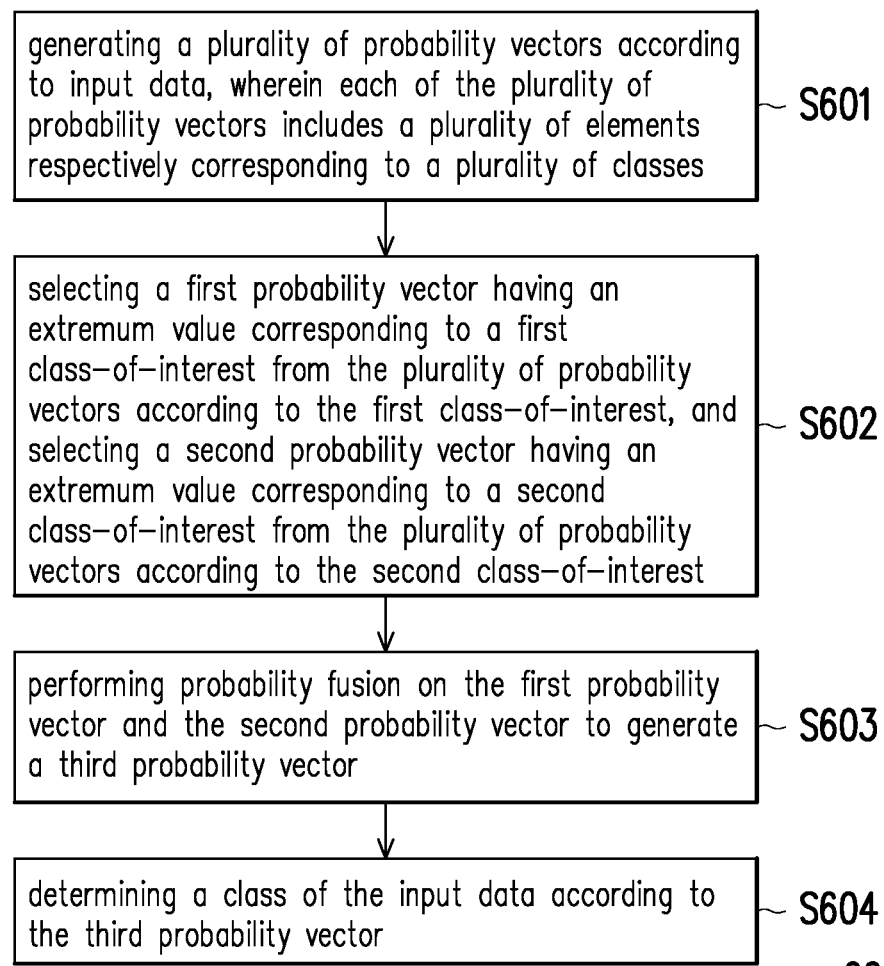
FIG. 6A is a flowchart of another classification method based on probability fusion according to an embodiment of the disclosure.

FIG. 6A is a flowchart of another classification method 600 based on probability fusion according to an embodiment of the disclosure, wherein the classification method 600 may be implemented by the classifier 450 as shown in FIG. 4A, but the disclosure is not limited thereto. In step S601, the sub-classifier 451 may generate a plurality of probability vectors v1, v2, . . . , and vn according to input data IN, wherein each of the plurality of probability vectors v1, v2, . . . , and vn includes a plurality of elements respectively corresponding to a plurality of classes. In step S602, the sub-fusion layer 4521 may select a first probability vector p1 having an extremum value corresponding to a first class-of-interest from the plurality of probability vectors v1, v2, . . . , and vn according to the first class-of-interest, and the sub-fusion layer 4522 may select a second probability vector p2 having an extremum value corresponding to the second class-of-interest from the plurality of probability vectors v1, v2, . . . , and vn according to a second class-of-interest. In step S603, the second fusion layer 454 may perform probability fusion on the first probability vector p1 and the second probability vector p2 to generate a third probability vector p3. In step S604, the output layer 453 may determine a class of the input data IN according to the third probability vector p3.

Figure 6B:
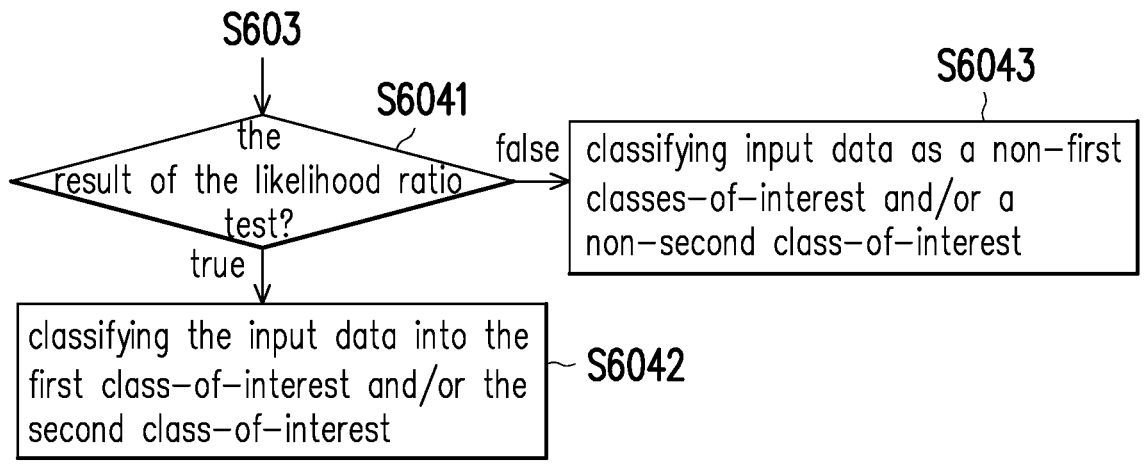
FIG. 6B further illustrates a flowchart of step S604 according to an embodiment of the disclosure.

FIG. 6B further illustrates a flowchart of step S604 according to an embodiment of the disclosure. In some embodiments, step S604 may be broken down into step S6041, step S6042, and step S6043. In step S6041, the output layer 453 may perform a likelihood ratio test on the third probability vector p3 according to the first class-of-interest and/or the second class-of-interest. If the result of the likelihood ratio test is true (i.e.: equation (2) is true), then proceeding to step S6042, the output layer 453 may classify the input data IN into the first class-of-interest and/or the second class-of-interest. On the other hand, if the result of the likelihood ratio test is false (i.e.: equation (2) is false), then the process proceeds to step S6043, the output layer 153 classifies the input data IN as a non-first class-of-interest and/or a non-second class-of-interest.

In an embodiment, after proceeding to step S6043, if a likelihood ratio test performed on the third probability vector p3 according to the first class-of-interest by the output layer 453 is true, and a likelihood ratio test performed on the third probability vector p3 according to the second class-of-interest by the output layer 453 is true, the output layer 153 may classify the input data IN into the class-of-interest having the higher probability between the first class-of-interest and second class-of-interest. For example, when a likelihood ratio test performed on the third probability vector p3 according to the first class-of-interest by the output layer 453 is true, and when a likelihood ratio test performed on the third probability vector p3 according to the second class-of-interest by the output layer 453 is true, if the probability that the output data IN belongs to the first class-of-interest is higher than the probability that the output data IN belongs to the second class-of-interest, the output layer 453 classifies the output data IN as the first class-of-interest.

Figure 6C:
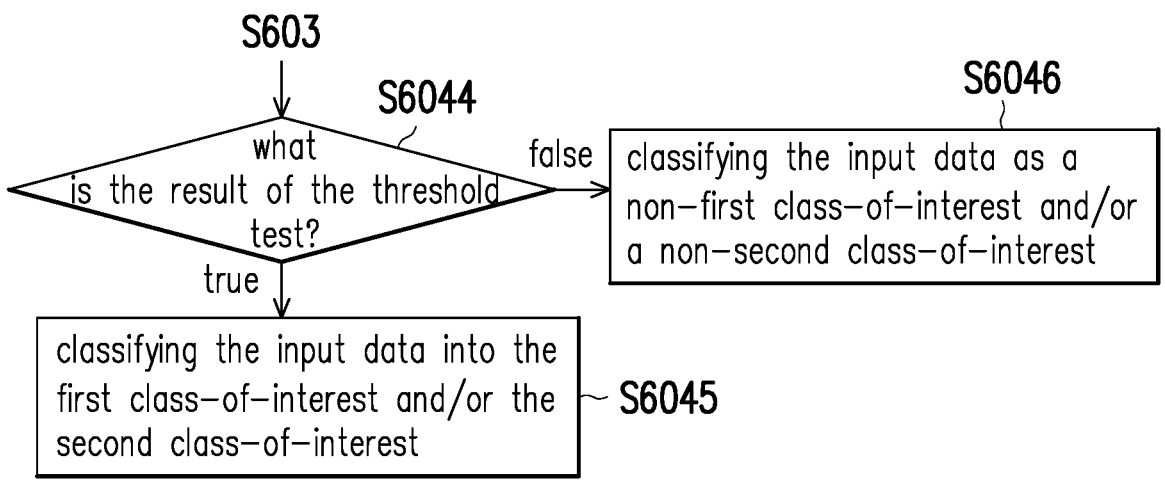
FIG. 6C further illustrates a flowchart of step S604 according to an embodiment of the disclosure.

FIG. 6C further illustrates a flowchart of step S604 according to an embodiment of the disclosure. In some embodiments, step S604 may be broken down into step S6044, step S6045, and step S6046. In step S6044, the output layer 453 may perform a threshold test on the third probability vector p3 according to the first class-of-interest and/or the second class-of-interest and a predetermined threshold β. If the result of the threshold test is true (i.e.: equation (3) is true), then the process proceeds to step S6045, the output layer 453 classifies the input data IN into a first class-of-interest and/or a second class-of-interest. On the other hand, if the result of the threshold test is false (i.e.: equation (3) is false), then the process proceeds to step S6046, the output layer 453 classifies the input data IN as a non-first class-of-interest and/or a non-second class-of-interest.

Figure 7:
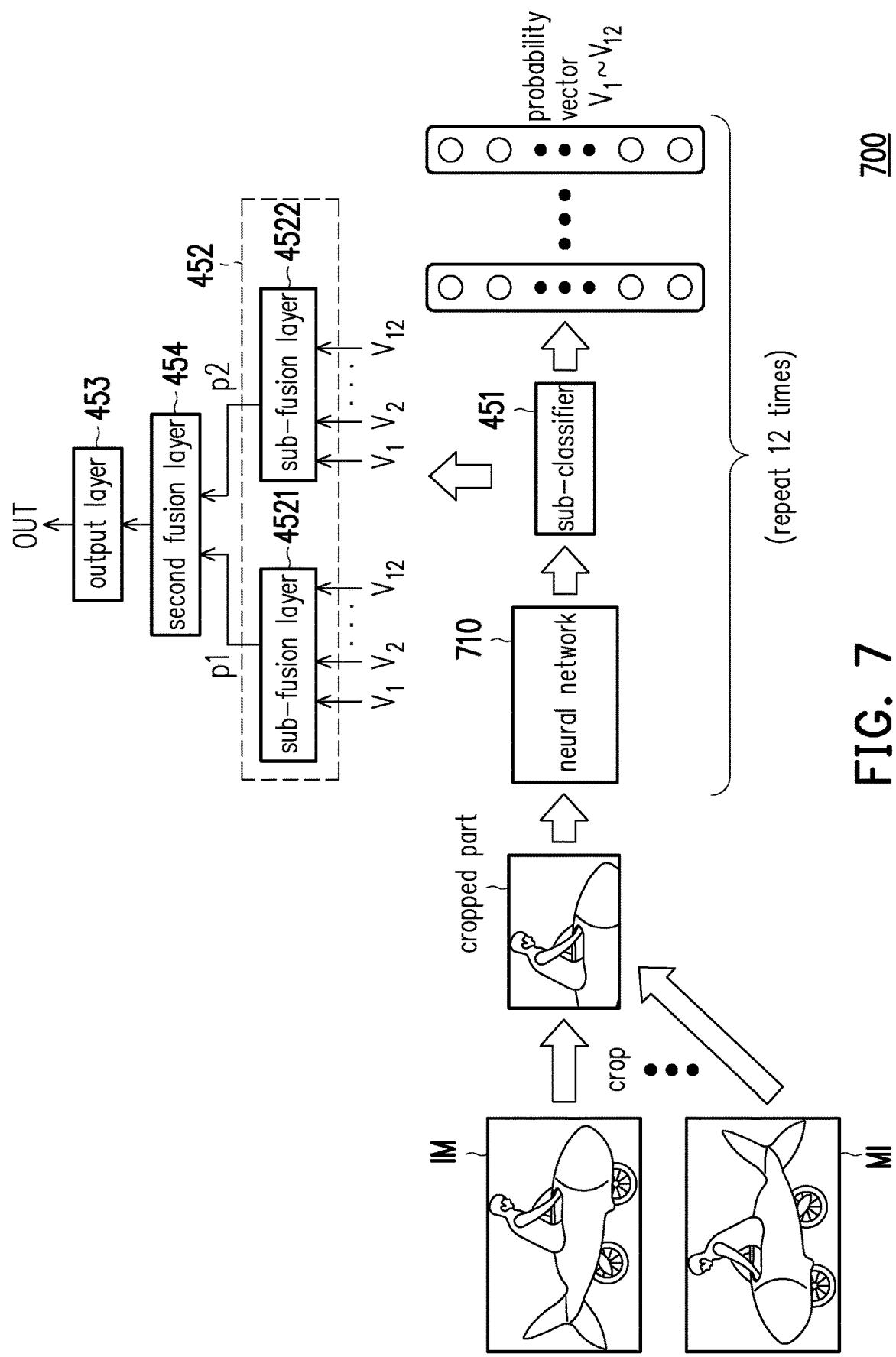
FIG. 7 is a schematic diagram of applying a classifier 450 to a classification system based on a multi-crop (12-crop) neural network according to an embodiment of the disclosure.

FIG. 7 is a schematic diagram of applying a classifier 450 to a classification system 700 based on a multi-crop (12-crop) neural network according to an embodiment of the disclosure. In the field of neural network-based image recognition, the multi-crop evaluation technique may be performed by cropping a single image into a plurality of cropped parts, and respectively inputs the plurality of cropped parts into the corresponding classifier to increase the diversity of the label data. In FIG. 7, the classification system 700 may crop the image data IM and the mirror data of the image data IM into six cropped parts, respectively (a total of 12 cropped parts). For example, the classification system may crop the upper right corner of the image data IM into an upper right corner cropped part, or crop the upper left corner of the image data IM into an upper left corner cropped part (the size of the cropped part may be smaller than the size of the image data IM), etc., but the disclosure is not limited thereto.

After generating 12 cropped parts, the classification system 700 may input one of the 12 cropped parts into the model of the neural network 710. The neural network 710 and the sub-classifier 451 may generate a corresponding probability vector according to any of the cropped parts. After repeating the execution 12 times in this way, the sub-classifier 451 may generate 12 probability vectors, which are probability vectors v1, v2, . . . , and v12, respectively. Then, after receiving the probability vectors v1, v2, . . . , and v12, the fusion layer may generate a first probability vector p1 according to the first class-of-interest and a second probability vector p2 according to the second class-of-interest. After generating the first probability vector p1 and the second probability vector p2, the second fusion layer 454 may perform probability fusion on the first probability vector p1 and the second probability vector p2 to generate a third probability vector p3. After obtaining the third probability vector p3, the output layer 453 may receive the third probability vector p3, and determine the class of the image data IM according to the third probability vector p3.

Figure 8:
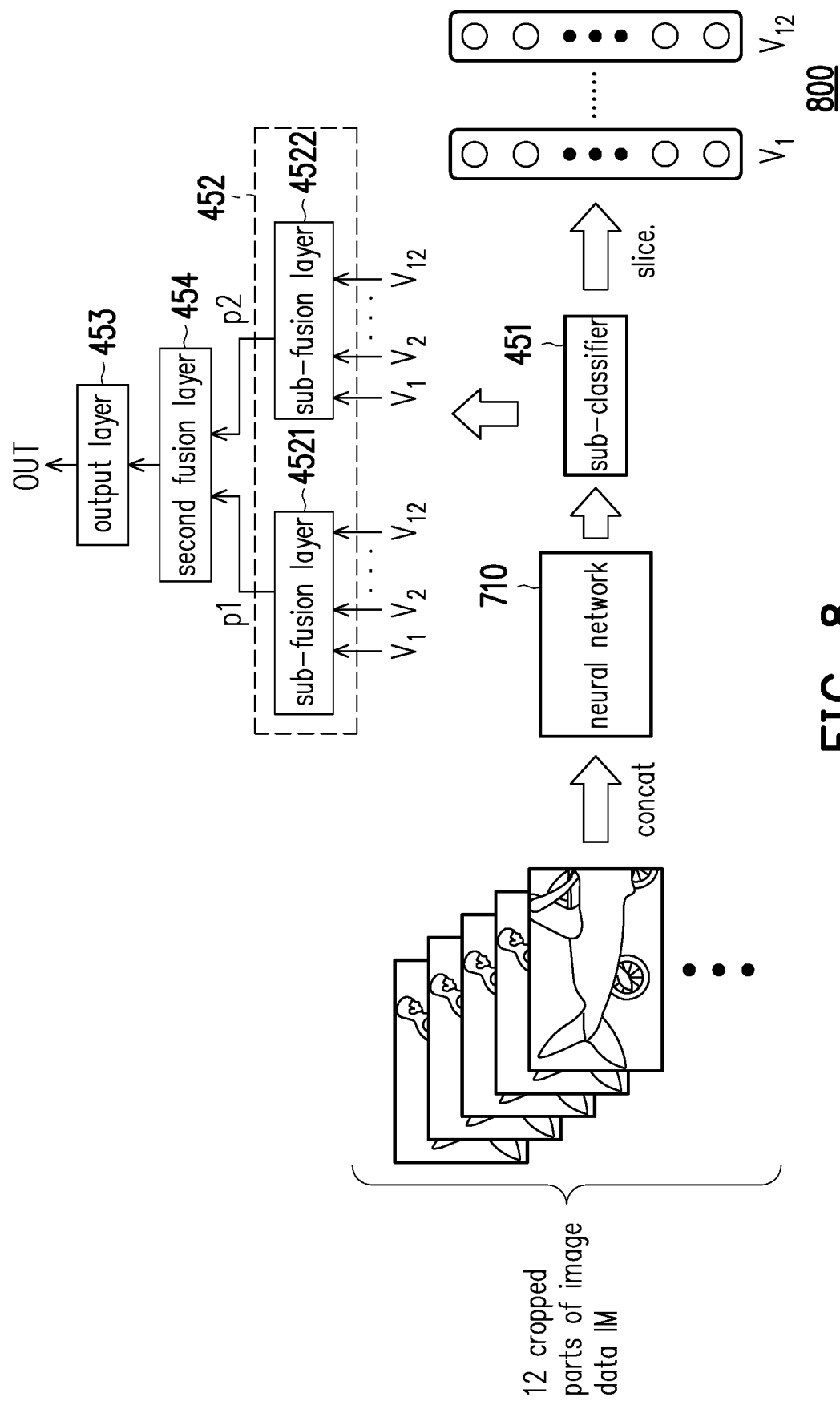
FIG. 8 is a schematic diagram of applying a classifier to another classification system based on a multi-crop (12-crop) neural network according to an embodiment of the disclosure.

FIG. 8 is a schematic diagram of applying a classifier 450 to another multi-crop-based neural network-based classification system 800 according to an embodiment of the disclosure. The classification system 800 is similar to the classification system 700, both of which use a 12-crop neural network architecture. However, unlike the classification system 700, 12 cropped parts are respectively input into the neural network 710, and the classification system 800 uses a concat function on 12 cropped parts to generate concatenation data, and then input the concatenation data into the neural network 710. The neural network 710 and the sub-classifier 451 may generate a corresponding probability vector according to the concatenation data, and slice the generated probability vector to obtain 12 probability vectors v1, v2, . . . , and v12 corresponding to 12 cropped parts respectively. Then, after receiving the probability vectors v1, v2, . . . , and v12, the fusion layer 452 may generate a first probability vector p1 according to the first class-of-interest, and generate a second probability vector p2 according to the second class-of-interest. After generating the first probability vector p1 and the second probability vector p2, the second fusion layer 454 may perform probability fusion on the first probability vector p1 and the second probability vector p2 to generate a third probability vector p3. After obtaining the third probability vector p3, the output layer 453 may receive the third probability vector p3, and the class of the image data IM is determined according to the third probability vector p3.

Figure 9:
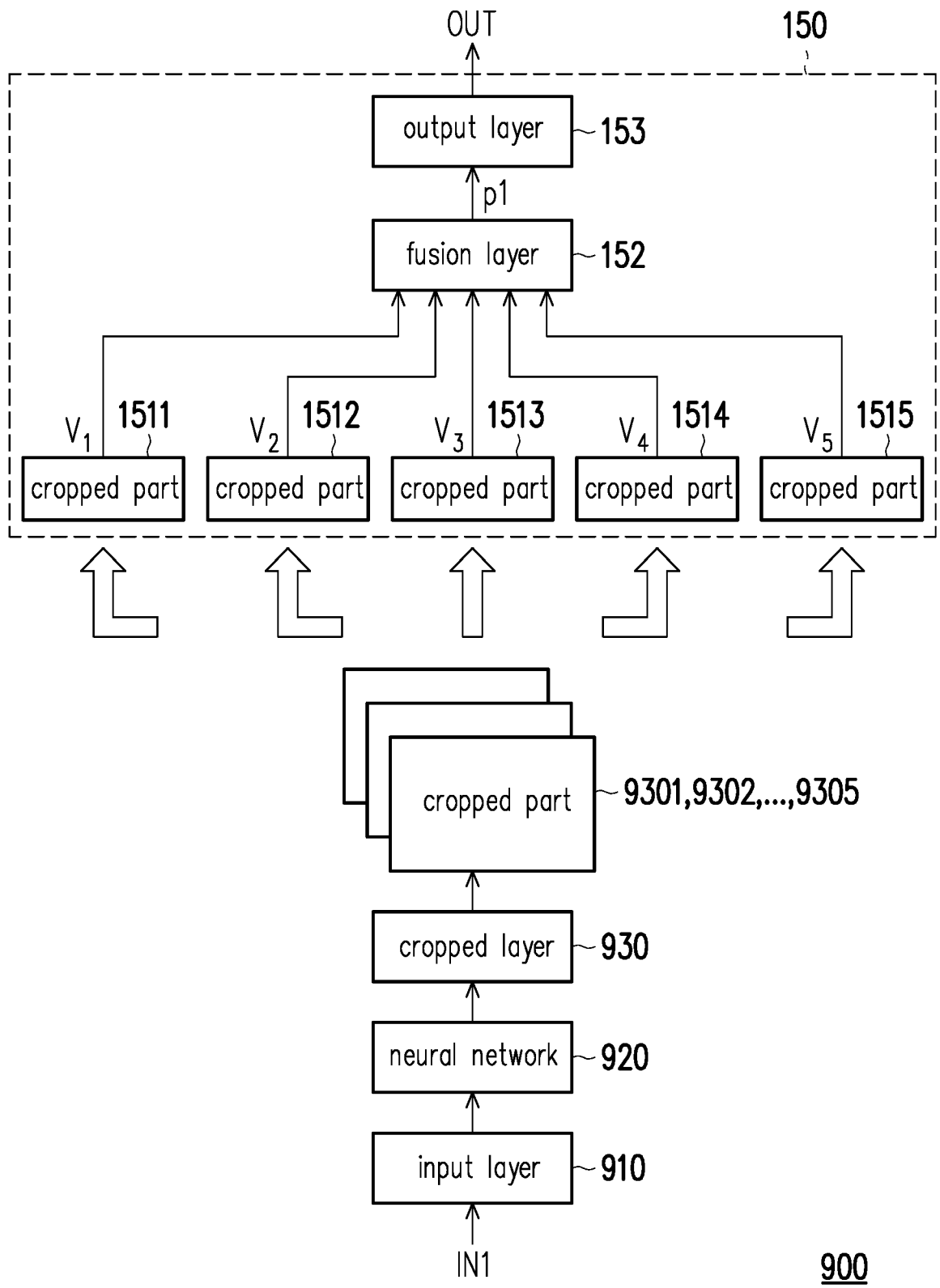
FIG. 9 is a schematic diagram of a neural network-based classification system having a multi-crop architecture according to an embodiment of the disclosure.

FIG. 9 is a schematic diagram of a neural network-based classification system 900 having a multi-crop architecture according to an embodiment of the disclosure. The classification system 900 is suitable for users who are interested in a single class. Therefore, the classifier 150 as shown in FIG. 1B may be applied to the classification system 900, but the disclosure is not limited thereto. The classification system 900 may include an input layer 910, a neural network 920, a cropped layer 930, and a classifier 150.

The input layer 910 is configured to receive input data IN1 and input the input data IN1 to the neural network 920. The input data IN1 may be image data or other types of multimedia data, but the disclosure is not limited thereto.

The neural network 920 may receive the input data IN1 from the input layer 910 and generate a feature map based on the input data IN1, wherein the neural network 920 may be, for example, a convolution neural network. The neural network 920 may also be, for example, an autoencoder neural network, a deep learning neural network, a deep residual learning neural network, a Boltzmann machine neural network, a recursive neural network, or a multilayer perceptron neural network, and the disclosure is not limited thereto. In this embodiment, any kind of trained neural network may be applied as the neural network 920. Thus, a classifier (e.g.: sub-classifiers 1511, 1512, 1513, 1514, and 1515) corresponding to the trained neural network 920 do not need to be retrained.

The cropped layer 930 may receive a feature map from the neural network 920 and crop the feature map to generate a plurality of cropped parts of the feature map. In this embodiment, the cropped layer 930 crops the feature map into five different cropped parts, which are cropped parts 9301, 9302, 9303, 9304, and 9305, respectively. However, parameters such as the quantity and size of the cropped parts and the position of the corresponding feature map may be adjusted by the user according to his needs, and the disclosure is not limited thereto. In this embodiment, the sub-classifier 1511 may generate the probability vector v1 according to the cropped part 9301. Similarly, sub-classifiers 1512, 1513, 1514, and 1515 may generate probability vectors v2, v3, v4, and v5 according to cropped parts 9302, 9303, 9304, and 9305, respectively.

The fusion layer 152 may select a first probability vector p1 having an extremum value corresponding to the first class-of-interest from the plurality of probability vectors v1, v2, v3, v4, and v5 according to the first class-of-interest, where the first class-of-interest corresponds to one of a plurality of elements in each of a plurality of probability vectors.

After obtaining the first probability vector p1, the output layer 153 may receive the first probability vector p1, and the class of the input data IN1 is determined according to the first probability vector p1.

Figure 10:
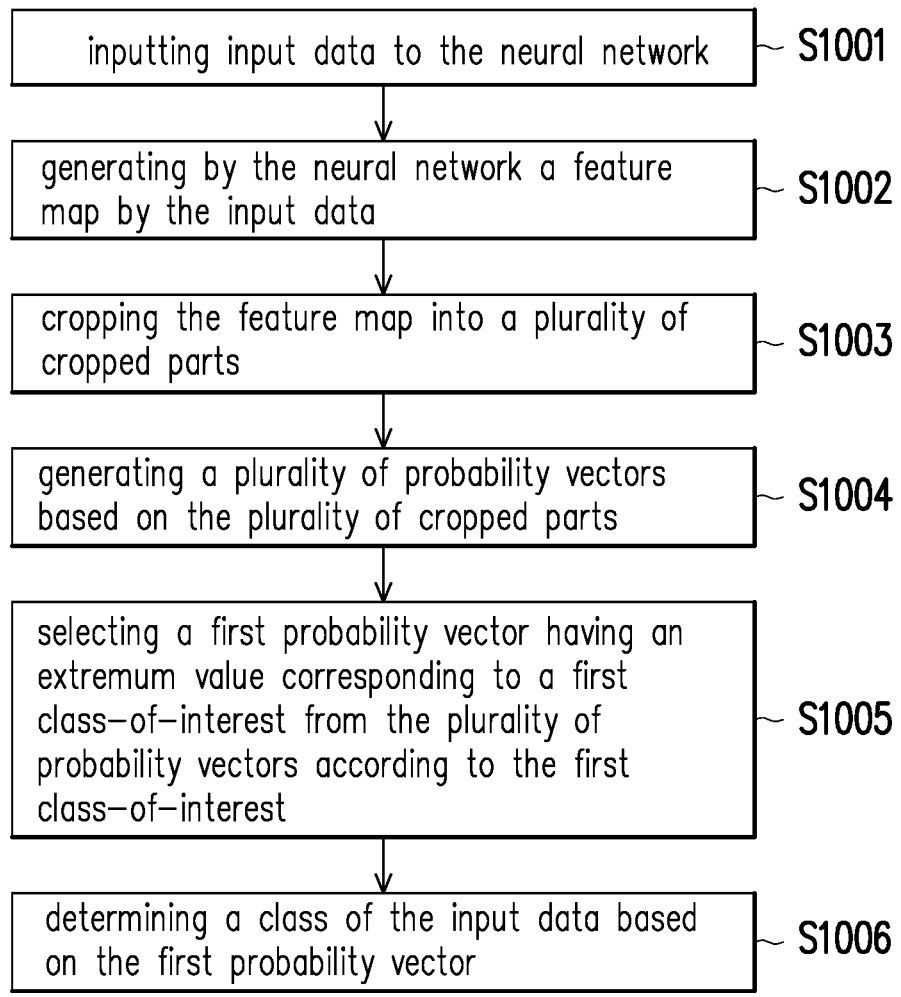
FIG. 10 is a flowchart based on a multi-crop architecture and a neural network-based classification method according to an embodiment of the disclosure.

FIG. 10 is a flowchart based on a multi-crop architecture and a neural network-based classification method 1000 according to an embodiment of the disclosure, wherein the classification method 1000 may be implemented by the classification system 900 as shown in FIG. 9, but the disclosure is not limited thereto. In step S1001, input data is inputted to the neural network. In step S1002, the neural network generates a feature map by the input data. In step S1003, the feature map is cropped into a plurality of cropped parts. In step S1004, a plurality of probability vectors are generated based on the plurality of cropped parts. In step S1005, a first probability vector having an extremum value corresponding to a first class-of-interest is selected from the plurality of probability vectors according to the first class-of-interest. In step S1006, the class of the input data is determined according to the first probability vector.

Figure 11:
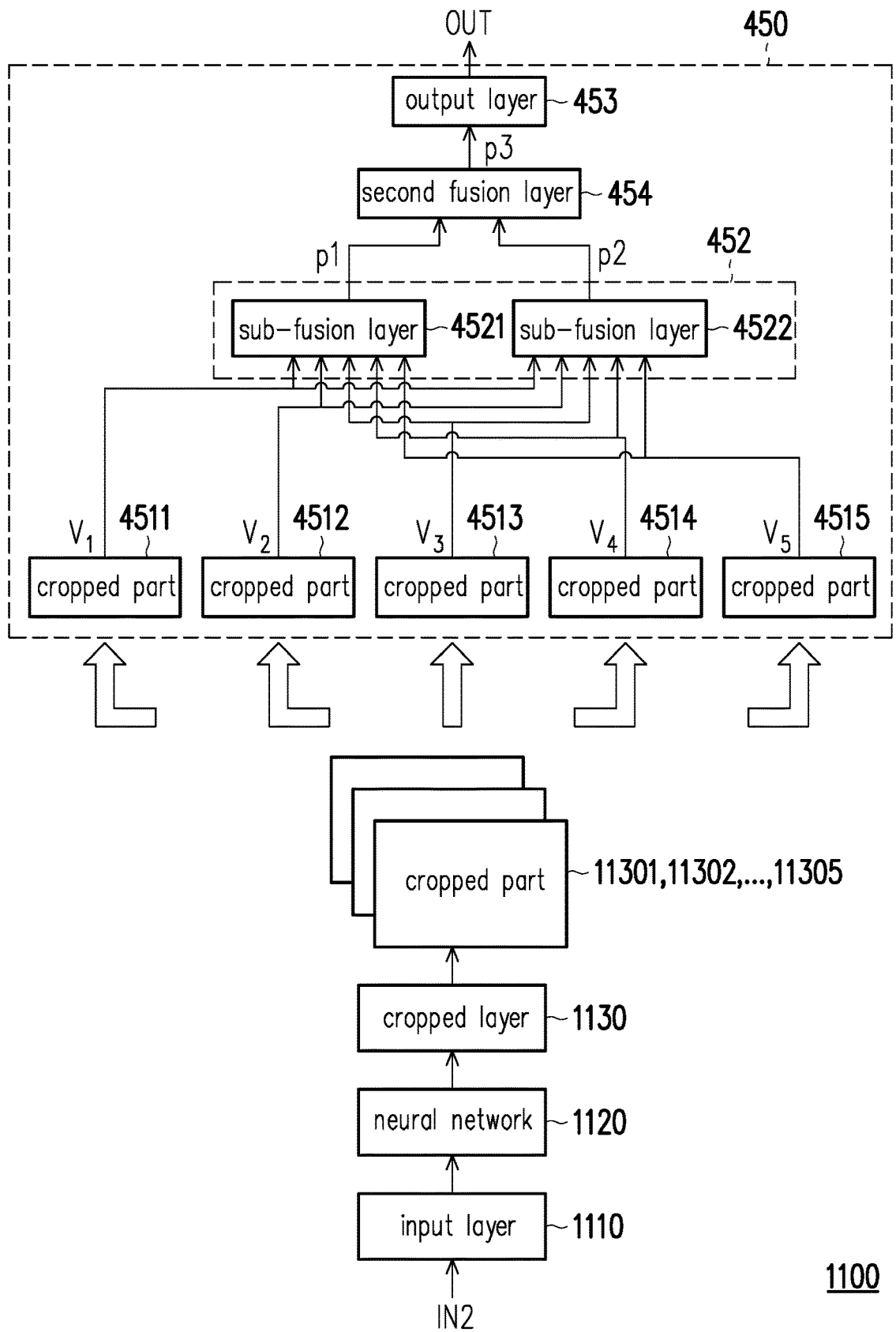
FIG. 11 is a schematic diagram of another neural network-based classification system with a multi-crop architecture according to an embodiment of the disclosure.

FIG. 11 is a schematic diagram of another neural network-based classification system 1100 having a multi-crop architecture according to an embodiment of the disclosure. The classification system 1100 is suitable for users who are interested in a plurality of classes. Although in the embodiment of FIG. 11 it is assumed that the user is interested in two classes, the disclosure is not limited thereto. The classification system 1100 may include an input layer 1110, a neural network 1120, a cropped layer 1130, and a classifier 450.

The input layer 1110 is to receive input data IN2 and input the input data IN2 into the neural network 1120. The input data IN2 may be image data or other types of multimedia data, but the disclosure is not limited thereto.

The neural network 1120 may receive the input data IN2 from the input layer 1110 and generate a feature map according to the input data IN2, wherein the neural network 1120 may be, for example, a convolution neural network. The neural network 1120 may also be, for example, an autoencoder neural network, a deep learning neural network, a deep residual learning neural network, a Boltzmann machine neural network, a recursive neural network, or a multilayer perceptron neural network, and the disclosure is not limited thereto. In this embodiment, any type of trained neural network may be applied as the neural network 1120. Thus, a classifier (e.g.: sub-classifiers 4511, 4512, 4513, 4514, and 4515) corresponding to the trained neural network 1120 do not need to be retrained.

The cropped layer 1130 may receive a feature map from the neural network 1120 and crop the feature map to generate a plurality of cropped parts of the feature map. In the embodiment, the cropped layer 1130 crops the feature map into five different cropped parts, which are cropped parts 11301, 11302, 11303, 11304, and 11305, respectively. However, parameters such as the quantity and size of the cropped parts and the position of the corresponding feature map may be adjusted by the user according to his needs, and the disclosure is not limited thereto. In this embodiment, the sub-classifier 4511 may generate the probability vector v1 according to the cropped part 9301. Similarly, sub-classifiers 4512, 4513, 4514, and 4515 may generate probability vectors v2, v3, v4, and v5 according to cropped parts 11302, 11303, 11304, and 11305, respectively.

The fusion layer 452 may include a sub-fusion layer 4521 and a sub-fusion layer 4522, wherein the sub-fusion layer 4521 may select a first probability vector p1 having an extremum value corresponding to the first class-of-interest from the plurality of probability vectors v1, v2, v3, v4, and v5 according to the first class-of-interest, and the sub-fusion layer 4522 may select a second probability vector p2 having an extremum value corresponding to the second class-of-interest from the plurality of probability vectors v1, v2, v3, v4, and v5 according to the second class-of-interest.

After generating the first probability vector p1 and the second probability vector p2, the second fusion layer 454 may perform probability fusion on the first probability vector p1 and the second probability vector p2 to generate a third probability vector p3.

After obtaining the third probability vector p3, the output layer 453 may receive the third probability vector p3, and determine the class of the input data IN2 according to the third probability vector p3.

Figure 12:
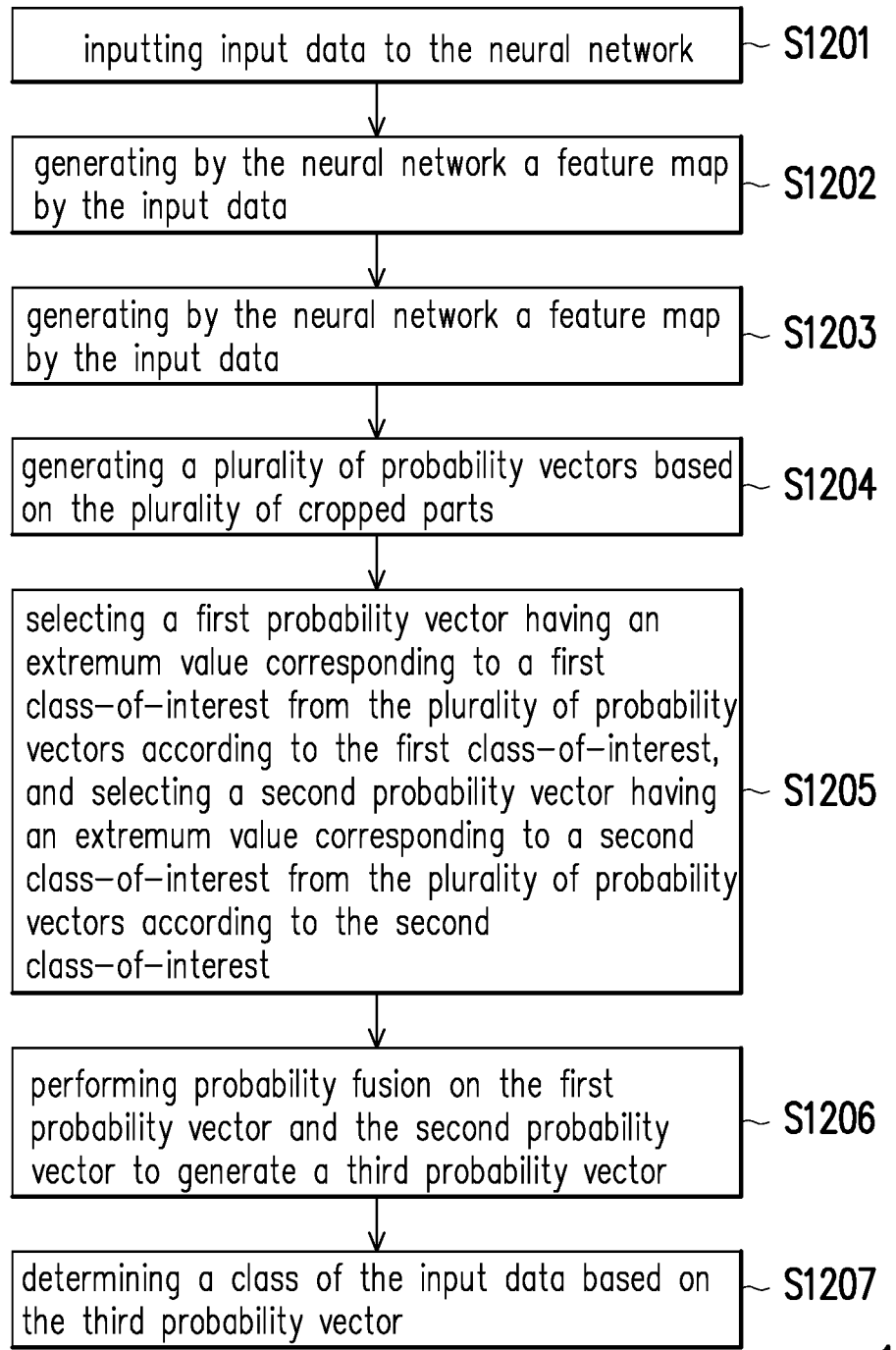
FIG. 12 is another flowchart based on a multi-crop architecture and a neural network-based classification method according to an embodiment of the disclosure.

FIG. 12 is another flowchart based on a multi-crop architecture and a neural network-based classification method 1200 according to an embodiment of the disclosure, wherein the classification method 1200 may be implemented by a classification system 1100 as shown in FIG. 11, but the disclosure not limited to this. In step S1201, input data is inputted into the neural network. In step S1202, the neural network generates a feature map by the input data. In step S1203, the feature map is cropped into a plurality of cropped parts. In step S1204, a plurality of probability vectors are generated according to the plurality of cropped parts. In step S1205, a first probability vector having an extremum value corresponding to a first class-of-interest is selected from the plurality of probability vectors according to the first class-of-interest, and a second probability vector having an extremum value corresponding to the second class-of-interest is selected from the plurality of probability vectors according to a second class-of-interest. In step S1206, probability fusion is performed on the first probability vector and the second probability vector to generate a third probability vector. In step S1207, the class of the input data is determined according to the third probability vector.

Figure 13:
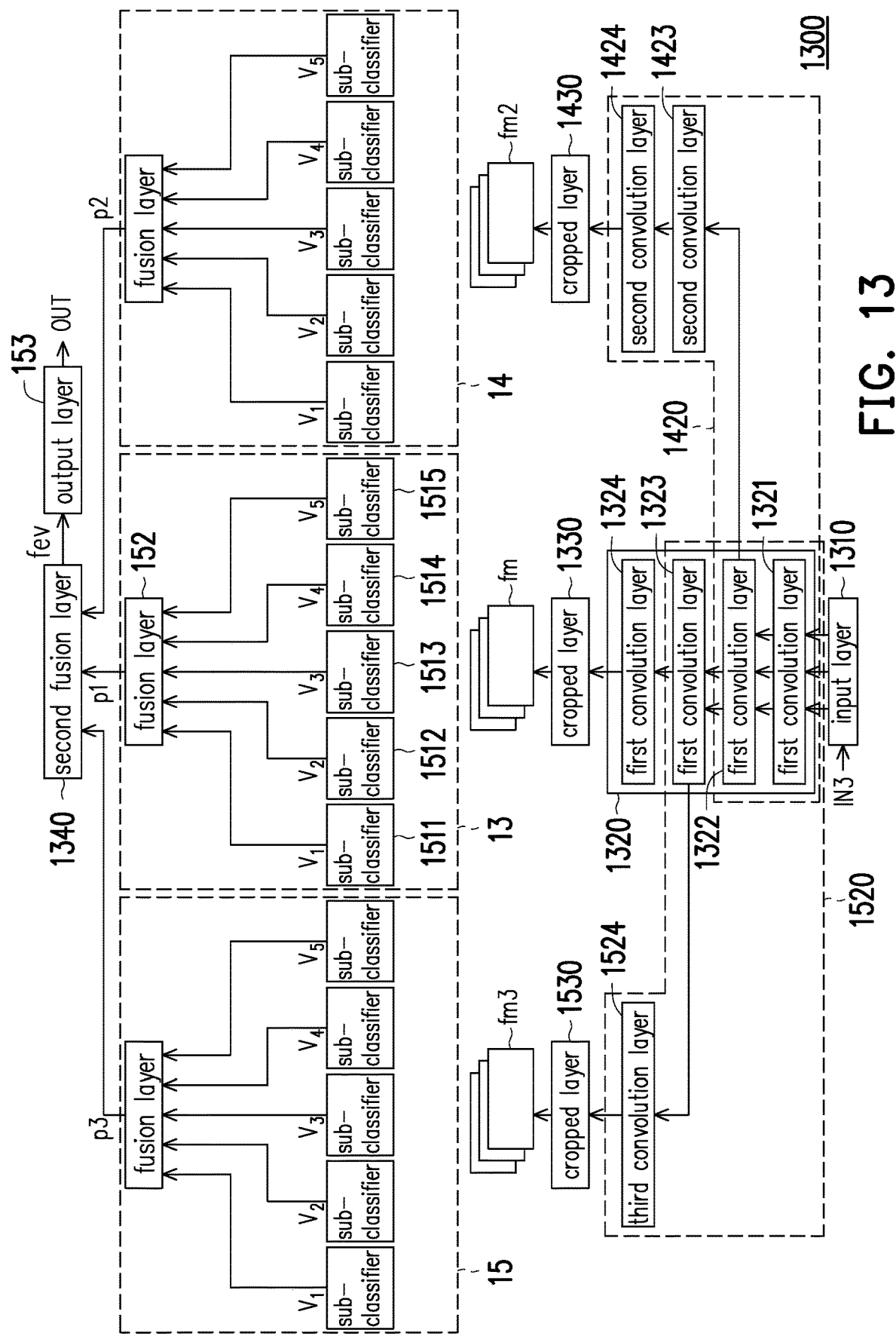
FIG. 13 is a schematic diagram of a plurality of neural network-based classification systems having a multi-crop architecture according to an embodiment of the disclosure.

In an embodiment, the classification system of the disclosure may also gradually increase the number of applied neural networks. FIG. 13 is a schematic diagram of a plurality of neural network-based classification systems 1300 having a multi-crop architecture according to an embodiment of the disclosure. The classification system 1300 is suitable for users who are interested in a single class. The classification system 1300 may include an input layer 1310, a neural network 1320, a cropped layer 1330, a plurality of sub-classifiers (including: sub-classifiers 1511, 1512, 1513, 1514, and 1515), a fusion layer 152, and an output layer 153. For ease of explanation, all of the components (including sub-classifiers 1511, 1512, 1513, 1514, 1515, and the fusion layer 152) framed by block 13 are collectively referred to as first module 13.

The input layer 1310 is for receiving input data IN3 and inputting the input data IN3 to the neural network 1320. The input data IN3 may be image data or other types of multimedia data, but the disclosure is not limited thereto.

The neural network 1320 may receive the input data IN3 from the input layer 1310 and generate a first feature map according to the input data IN3.

The cropped layer 1330 may receive the first feature map from the neural network 1320 and crop the first feature map to generate a plurality of cropped parts fm of the first feature map. In the embodiment, the cropped layer 1330 crops the first feature map into five different cropped parts. However, parameters such as the quantity and size of the cropped parts and the position of the corresponding feature map may be adjusted by the user according to his needs, and the disclosure is not limited thereto.

The sub-classifier 1511 may generate a probability vector v1 according to one of a plurality of cropped parts fm. Similarly, the sub-classifiers 1512, 1513, 1514, and 1515 may generate the probability vectors v2, v3, v4, and v5 according to one of the plurality of cropped parts fm, respectively. The fusion layer 152 may select a first probability vector p1 having an extremum value corresponding to the first class-of-interest from the plurality of probability vectors v1, v2, v3, v4, and v5 according to the first class-of-interest, wherein first class-of-interest corresponds to one of a plurality of elements in each of the plurality of probability vectors. The output layer 153 may receive the first probability vector p1 (where p1 may be processed without the second fusion layer 1340), and determine the class of the input data IN3 according to the first probability vector p1.

In the disclosure, neural network 1320 may be, for example, a convolution neural network. The neural network 1320 may include a plurality of first convolution layers. The plurality of first convolution layers include first convolution layers 1321, 1322, 1323, and 1324, wherein the number of first convolution layers may be any natural number, and the disclosure is not limited thereto. Alternatively, the first convolution layers 1321, 1322, 1323, and 1324 may also be convolution layers of different sizes, and the disclosure is not limited thereto. The fusion layer 152 of the first module 13 may output a first probability vector p1 corresponding to the neural network 1320. The output layer 153 may receive the first probability vector p1 and determine the classification of the input data IN3 according to the first probability vector p1. If all elements of the first probability vector p1 are less than a predetermined threshold, it is difficult for the classification system 1300 to determine the class to which the input data IN3 belongs according to the first probability vector p1. In response to this, the classification system 1300 may increase the neural networks applied.

Specifically, the classification system 1300 may further include a neural network 1420, a cropped layer 1430, a second module 14 and a second fusion layer 1340, wherein the function and configuration of the second module 14 is the same as that of the first module 13.

The neural network 1420 may be, for example, a convolution neural network. The neural network 1420 may receive input data IN3 from the input layer 1310 and generate a second feature map based on the input data IN3. The neural network 1420 may include a subset of the plurality of first convolution layers and at least one second convolution layer, wherein the number of convolution layers of the neural network 1420 is the same as the number of convolution layers of the neural network 1320, and the disclosure is not limited thereto. In neural network 1420, the subset of the first convolution layers includes first convolution layers 1321 and 1322. The at least one second convolution layer includes second convolution layers 1423 and 1424, wherein the number of second convolution layers may be any natural number, and the disclosure is not limited thereto. In the neural network 1420 of the embodiment, the arrangement order of the respective convolution layers (i.e.: the first convolution layers 1321 and 1322) in the subset of the first convolution layers is the same as and the arrangement order of the respective convolution layers in the subset of the neural network 1320, both are arranged in the order of the first convolution layers 1321 and 1322. However, the disclosure is not limited thereto.

The cropped layer 1430 may receive the second feature map from the neural network 1420 and crop the second feature map to generate a plurality of cropped parts fm2 of the second feature map.

The plurality of sub-classifiers in the second module 14 may receive a plurality of cropped parts fm2 of the second feature map, and generate a plurality of probability vectors according to the plurality of cropped parts fm2 of the second feature map. The fusion layer in the second module 14 may generate a second probability vector p2 according to the plurality of probability vectors.

After obtaining the second probability vector p2, the first probability vector p1 and the second probability vector p2 are not directly inputted to the output layer 153 but are first inputted to the second fusion layer 1340. The second fusion layer 1340 may perform probability fusion on the first probability vector p1 and the second probability vector p2 to generate a final probability vector fev. The probability fusion performed by the second fusion layer 1340 may be, for example, one of weighted average fusion, maximum fusion or random fusion, and the disclosure is not limited thereto.

After generating the final probability vector fev, the output layer 153 may receive the final probability vector fev and determine the classification of the input data IN3 according to the final probability vector fev. If all the elements of the final probability vector fev are still less than the preset threshold, the classification system 1300 may further increase the neural networks (e.g.: increase the neural network 1520 and its corresponding cropped layer 1530 and the third module 15, wherein the function and construction of the third module 15 is the same as that of the first module 13) to update the final probability vector fev until there is an element in the final probability vector fev that is higher than the preset threshold.

It should be noted that the classification system 1300 illustrated in FIG. 13 uses three neural networks (neural networks 1320, 1420 and 1520), but the number of neural networks applied may be adjusted by the user according to the concept of the disclosure.

Figure 14:
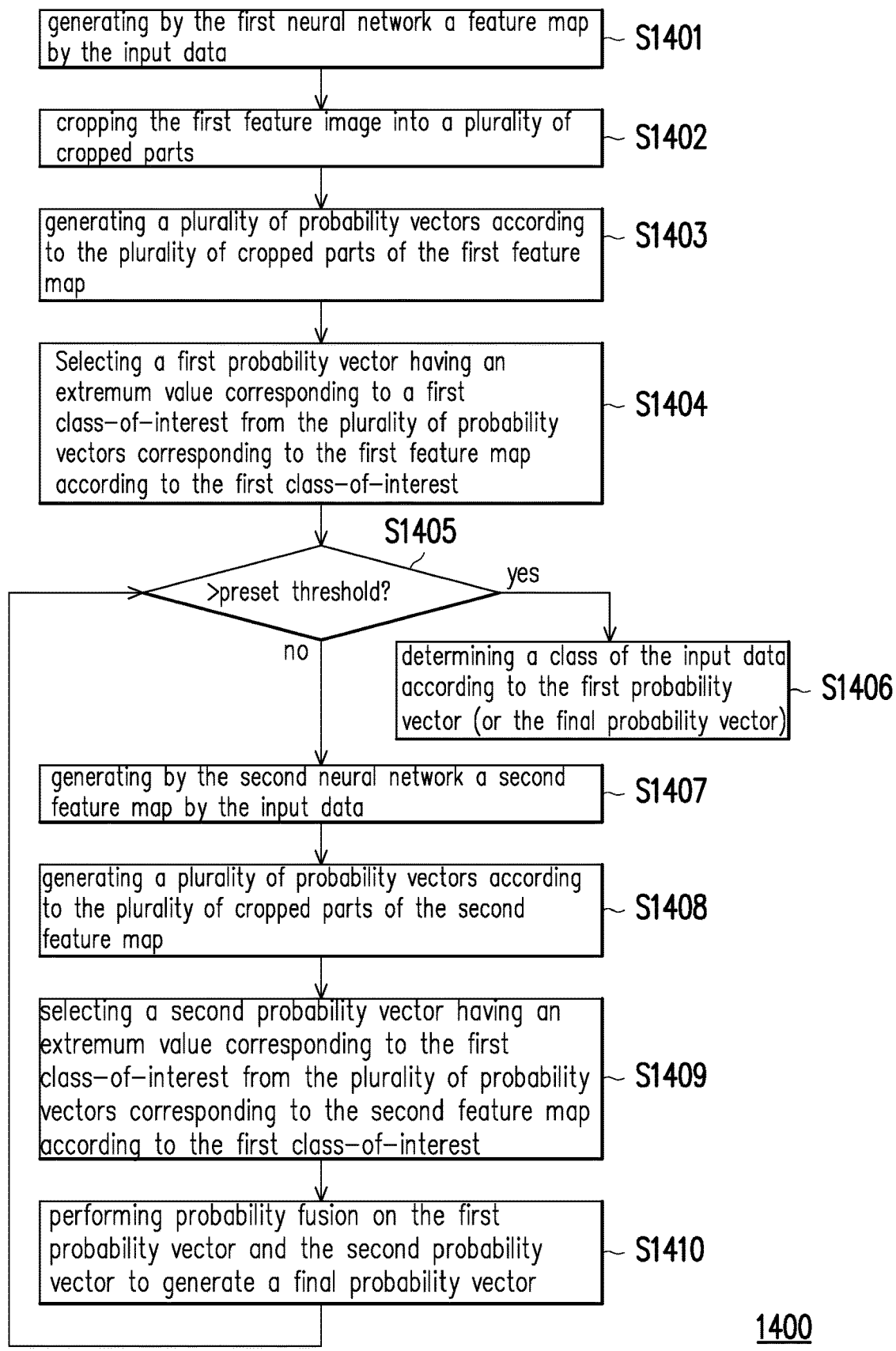
FIG. 14 is a flowchart based on a multi-crop architecture and a classification method based on a plurality of neural networks according to an embodiment of the disclosure.

FIG. 14 is a flowchart based on a multi-crop architecture and a classification method 1400 based on a plurality of neural networks according to an embodiment of the disclosure, wherein the classification method 1400 may be implemented by a classification system 1300 as shown in FIG. 13, but the disclosure is not limited to thereto. In step S1401, the first neural network generates a first feature map by the input data. In step S1402, the first feature map is cropped into a plurality of cropped parts. In step S1403, a plurality of probability vectors are generated according to the plurality of cropped parts of the first feature map. In step S1404, a first probability vector having an extremum value corresponding to a first class-of-interest is selected from the plurality of probability vectors corresponding to the first feature map according to the first class-of-interest. In step S1405, the elements of the first probability vector were compared to the preset threshold to determine whether the first probability vector has an element greater than the preset threshold in the first probability vector. If yes, the process proceeds to step S1406. If no, the process proceeds to step S1407. In step S1406, a class of the input data is determined according to the first probability vector. In step S1407, the second neural network generates a second feature map by the input data. In step S1408, a plurality of probability vectors are generated according to the plurality of cropped parts of the second feature map. In step S1409, a second probability vector having an extremum value corresponding to a first class-of-interest is selected from a plurality of probability vectors corresponding to the second feature map according to the first class-of-interest. In step S1410, probability fusion on the first probability vector and the second probability vector is performed to generate a final probability vector. After the final probability vector is generated, step S1405 may be re-entered to compare the elements of the final probability vector to the preset threshold to determine whether the final probability vector has an element greater than the preset threshold. When there is an element greater than the preset threshold in the final probability vector, the process may proceed to step S1406 to determine the class of the input data according to the final probability vector.

Figure 15:
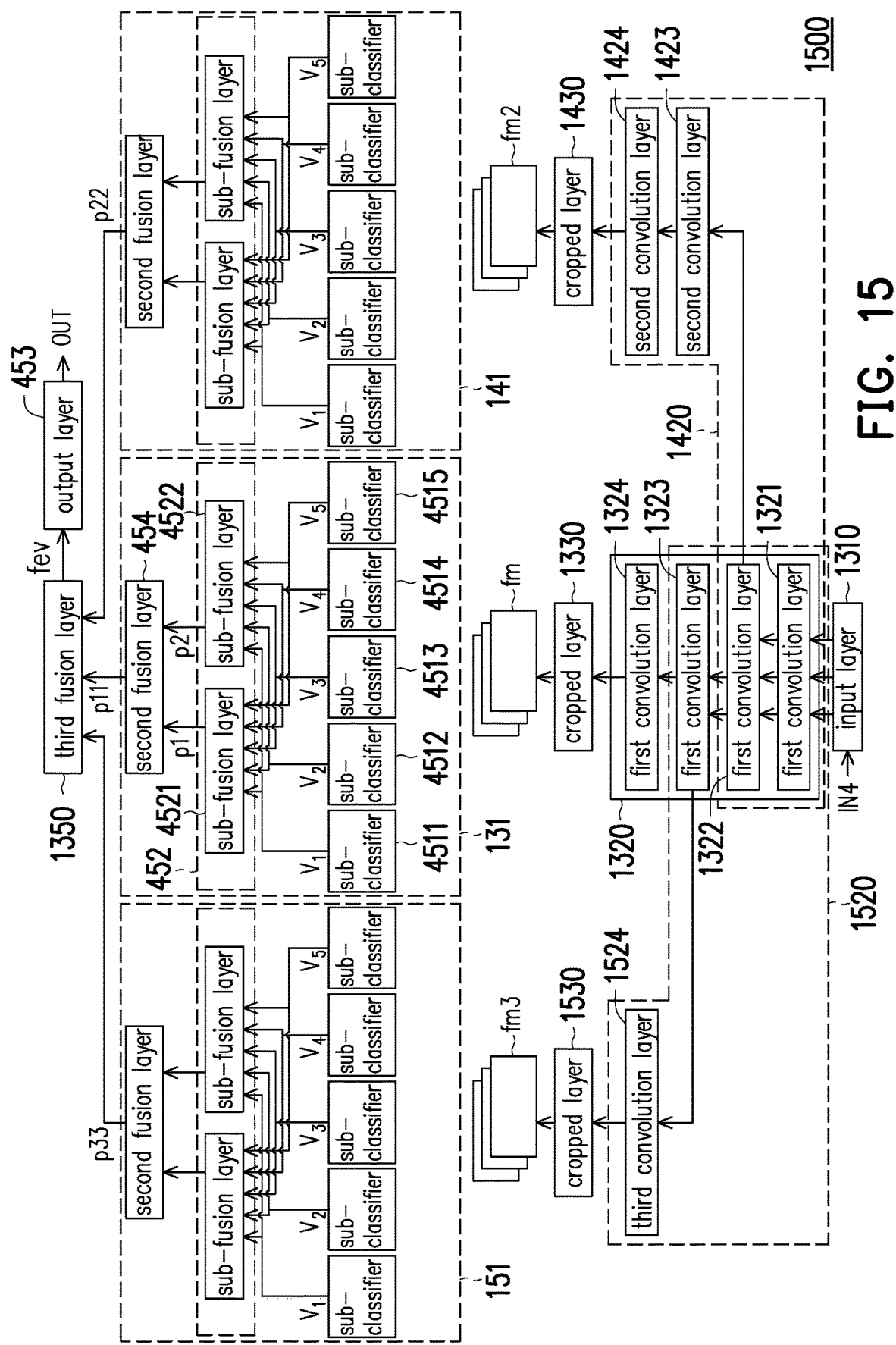
FIG. 15 is a schematic diagram of another classification system based on a plurality of neural networks having a multi-crop architecture according to an embodiment of the disclosure.

FIG. 15 is a schematic diagram of another classification system 1500 based on a plurality of neural networks having a multi-crop architecture according to an embodiment of the disclosure. The classification system 1500 is suitable for users who are interested in a plurality of classes. Although the embodiment of FIG. 15 assumes that the user is interested in two classes, the disclosure is not limited thereto.

The classification system 1500 may include an input layer 1310, a neural network 1320, a cropped layer 1330, a plurality of sub-classifiers (including: sub-classifiers 4511, 4512, 4513, 4514, and 4515), and a fusion layer 452 (including: sub-fusion layer 4521 and 4522) and output layer 453. For ease of explanation, all of the components (including sub-classifiers 4511, 4512, 4513, 4514, 4515, and the fusion layer 152) framed by block 131 are collectively referred to as first module 131.

The input layer 1310 is for receiving input data IN4 and inputting the input data IN4 to the neural network 1320. The input data IN4 may be image data or other types of multimedia data, but the disclosure is not limited thereto.

The neural network 1320 may receive input data IN4 from the input layer 1310 and generate a first feature map according to the input data IN4.

The cropped layer 1330 may receive the first feature map from the neural network 1320 and crop the first feature map to generate a plurality of cropped parts fm of the first feature map. In this embodiment, the cropped layer 1330 crops the first feature map into five different cropped parts. However, parameters such as the quantity and size of the cropped parts and the position of the corresponding feature map may be adjusted by the user according to his needs, and the disclosure is not limited thereto.

The sub-classifier 4511 may generate a probability vector v1 according to one of a plurality of cropped parts fm. Similarly, sub-classifiers 4512, 4513, 4514, and 4515 may generate probability vectors v2, v3, v4, and v5, respectively, based on one of a plurality of cropped parts fm.

The fusion layer 452 may include a sub-fusion layer 4521 and a sub-fusion layer 4522, wherein the sub-fusion layer 4521 may select a first probability vector p1 having an extremum value corresponding to the first class-of-interest from the plurality of probability vectors v1, v2, v3, v4, and v5 according to the first class-of-interest, and the sub-fusion layer 4522 may select a second probability vector p2 having an extremum value corresponding to the second class-of-interest from the plurality of probability vectors v1, v2, v3, v4, and v5 according to the second class-of-interest. After generating the first probability vector p1 and the second probability vector p2, the second fusion layer 454 may perform probability fusion on the first probability vector p1 and the second probability vector p2 to generate a probability vector p11 corresponding to the neural network 1320. The probability fusion performed by the second fusion layer 454 may be, for example, one of weighted average fusion, maximum fusion or random fusion, and the disclosure is not limited thereto. Next, the output layer 153 may receive the probability vector p11 and determine the class of the input data IN4 according to the probability vector p11.

In the disclosure, the neural network 1320 may be, for example, a convolution neural network. The neural network 1320 may include a plurality of first convolution layers. The plurality of first convolution layers includes first convolution layers 1321, 1322, 1323, and 1324, wherein the number of first convolution layers may be any natural number, and the disclosure is not limited thereto. Alternatively, the first convolution layers 1321, 1322, 1323, and 1324 may also be convolution layers of different sizes, and the disclosure is not limited thereto. The second fusion layer 454 of the first module 131 may output a probability vector p11 corresponding to the neural network 1320. The output layer 453 may receive the probability vector p11 and determine the classification of the input data IN4 according to the probability vector p11. If all the elements of the probability vector p11 are less than a preset threshold, it is difficult for the classification system 1500 to determine the class to which the input data IN4 belongs according to the probability vector p11. In response to this, the classification system 1500 may increase the neural networks applied.

Specifically, the classification system 1500 may further include a neural network 1420, a cropped layer 1430, a second module 141, and a third fusion layer 1350, wherein the second module 141 has the same function and configuration as the first module 131.

The neural network 1420 may be, for example, a convolution neural network. The neural network 1420 may receive input data IN4 from the input layer 1310 and generate a second feature map according to the input data IN4. The neural network 1420 may include a plurality of subsets of first convolution layers and at least one second convolution layer, wherein the neural network 1420 is similar in structure to the neural network 1320. For example, the number of convolution layers of the neural network 1420 may be the same as the number of convolution layers of the neural network 1320. In neural network 1420, a subset of the first convolution layer includes first convolution layers 1321 and 1322. The at least one second convolution layer includes second convolution layers 1423 and 1424, wherein the number of second convolution layers may be any natural number, and the disclosure is not limited thereto. In the neural network 1420 of the embodiment, the arrangement order of the respective convolution layers (i.e.: first convolution layers 1321 and 1322) in the subset of the first convolution layers is the same as the arrangement of the respective convolution layers in the subset in the neural network 1320, both are arranged in the order of the first convolution layers 1321 and 1322. However, the disclosure is not limited to this.

The cropped layer 1430 may receive the second feature map from the neural network 1420 and crop the second feature map to generate a plurality of cropped parts fm2 of the second feature map.

A plurality of sub-classifiers in the second module 141 may receive a plurality of cropped parts fm2s of the second feature map, and generate a plurality of probability vectors according to the plurality of cropped parts fm2s of the second feature map. The second fusion layer in the second module 141 may generate a probability vector p22 corresponding to the neural network 1420 according to the plurality of probability vectors.

After obtaining the probability vector p22, the probability vector p11 and the probability vector p22 are not directly inputted to the output layer 453, but are first inputted to the third fusion layer 1350. The third fusion layer 1350 may perform probability fusion on the probability vector p11 and the probability vector p22 to generate a final probability vector fev. The probability fusion implemented by the third fusion layer 1350 may be, for example, one of weighted average fusion, maximum fusion or random fusion, and the disclosure is not limited thereto.

After generating the final probability vector fev, the output layer 453 may receive the final probability vector fev and determine the classification of the input data IN4 according to the final probability vector fev. If all the elements of the final probability vector fev are still less than the preset threshold, the classification system 1500 may further increase the neural network (e.g.: increase the neural network 1520 and its corresponding cropped layer 1530 and third module 151, wherein the function and construction of the third module 151 is the same as the first module 131) to update the final probability vector fev, until there is an element in the final probability vector fev that is higher than the preset threshold.

It should be noted that the classification system 1500 shown in FIG. 15 uses three neural networks (neural networks 1320, 1420 and 1520), but the number of the neural networks applied may be adjusted by the user according to the concept of the disclosure.

Figure 16:
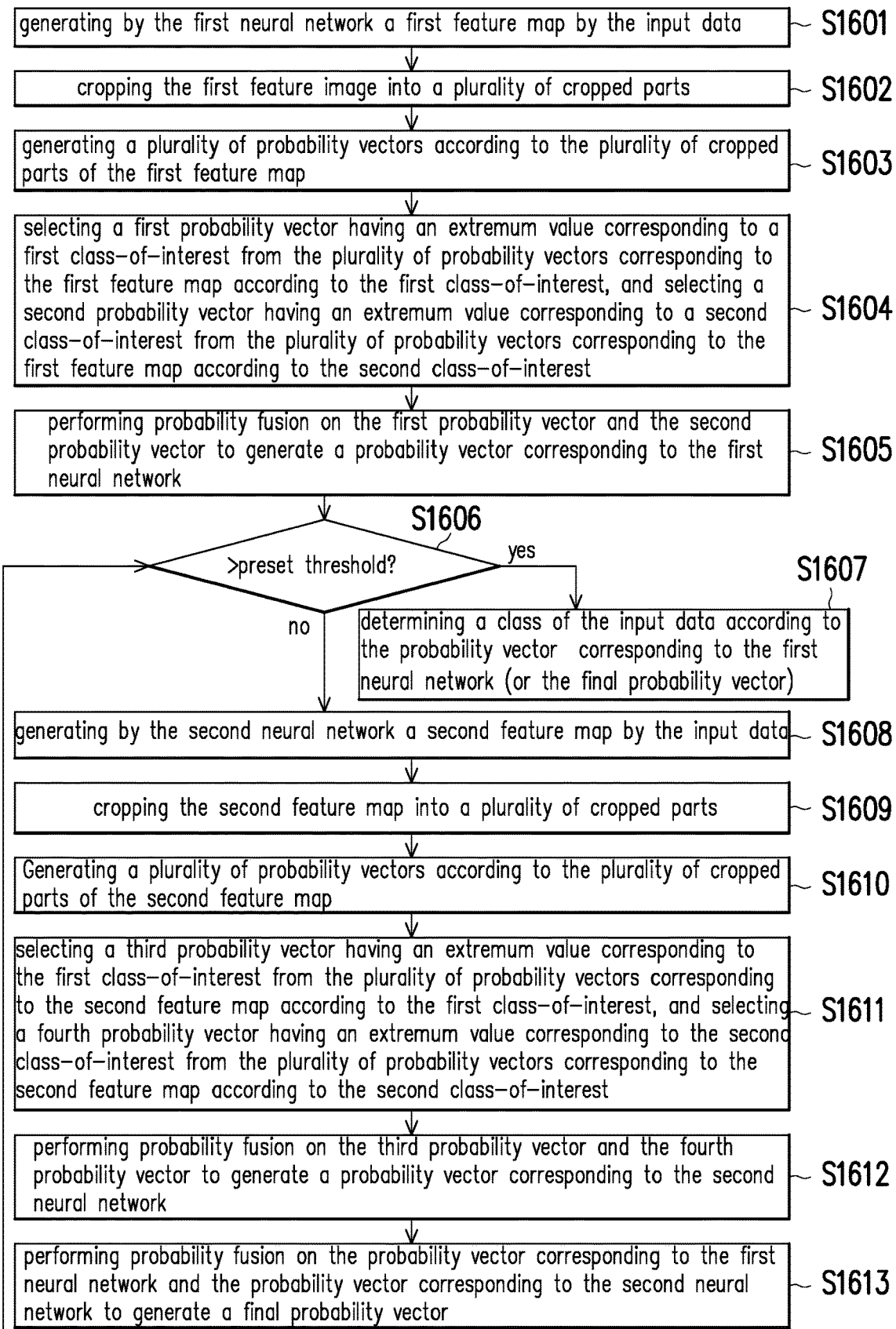
FIG. 16 is another flowchart based on a multi-crop architecture and a classification method based on a plurality of neural networks according to an embodiment of the disclosure.

FIG. 16 is another flowchart based on a multi-crop architecture and a classification method 1600 based on a plurality of neural networks according to an embodiment of a disclosure, wherein the classification method 1600 may be implemented by a classification system 1500 as shown in FIG. 15, but the disclosure is not limited thereto. In step S1601, the first neural network generates the first feature map by the input data. In step S1602, the first feature map is cropped into a plurality of cropped parts. In step S1603, a plurality of probability vectors are generated according to the plurality of cropped parts of the first feature map. In step S1604, a first probability vector having an extremum value corresponding to a first class-of-interest is selected from the plurality of probability vectors corresponding to the first feature map according to the first class-of-interest, and selecting a second probability vector having an extremum value corresponding to the second class-of-interest from the plurality of probability vectors corresponding to the first feature map according to a second class-of-interest. In step S1605, probability fusion is performed on the first probability vector and the second probability vector to generate a probability vector corresponding to the first neural network. In step S1606, it is compared whether there is an element larger than the preset threshold in the probability vector corresponding to the first neural network. If yes, the process proceeds to step S1607. If no, the process proceeds to step S1608. In step S1607, a class of the input data is determined according to the probability vector corresponding to the first neural network. In step S1608, the second neural network generates a second feature map by the input data. In step S1609, the second feature map is cropped into a plurality of cropped parts. In step S1610, a plurality of probability vectors are generated according to a plurality of cropped parts of the second feature map. In step S1611, a third probability vector having an extremum value corresponding to the first class-of-interest is selected from the plurality of probability vectors corresponding to the second feature map according to the first class-of-interest, and a fourth probability vector having an extremum value corresponding to the second class-of-interest is selected from the plurality of probability vectors corresponding to the second feature map according to the second class-to-interest. At step S1612, probability fusion is performed on the third probability vector and the fourth probability vector to generate a probability vector corresponding to the second neural network. In step S1613, the probability fusion is performed on the probability vector corresponding to the first neural network and the probability vector corresponding to the second neural network to generate a final probability vector. After the final probability vector is generated, step S1606 may be re-entered to compare whether the final probability vector has an element greater than the preset threshold. When there is an element greater than the preset threshold in the final probability vector, the process may proceed to step S1607 to determine the class of the input data according to the final probability vector.

Table 1 shows data sets in Dataset "_DS_1800112-R5" associated with an appearance image of a wafer of a dynamic random access memory (DRAM). Tables 2 and 3 show the performance comparison of the classification system (e.g.: classification system 1500) using the class-of-interest maximum fusion method (COIMax Fusion) of the disclosure and other classification systems (i.e.: classification system A and classification system B) on the data sets from Table 1, wherein the data sets used in Table 2 are the verification sets in Table 1, and the data sets used in Table 3 are the test sets in Table 1. In Tables 2 and 3, the first class-of-interest is the scratch on the appearance of the dynamic random access memory, and the second class-of-interest arrow on the appearance of the dynamic random access memory.

TABLE 1

| Dataset "_DS_1800112-R5" | | | | |
|---|---|---|---|---|
| class (label) | training set | verification set | test set | total |
| scratch | 985 | 212 | 230 | 1427 |
| arrow | 565 | 125 | 122 | 812 |
| particle | 2012 | 399 | 430 | 2841 |
| discoloration | 5493 | 1187 | 1152 | 7832 |
| normal | 386 | 77 | 66 | 529 |
| total | 9441 | 2000 | 2000 | 13441 |

TABLE 2

| | classification system A (multi-crop architecture and COIMax not used) | classification system B (used a six-crop architecture but not COIMax) | classification system 1500 (used six-crop architecture and COIMax) |
|---|---|---|---|
| overall error rate | 2.65% | 2.65% | 3.30% |
| overall error rate after using LRT | 2.90% | 2.85% | 3.65% |

TABLE 2-continued

|  | classification system A (multi-crop architecture and COIMax not used) | classification system B (used a six-crop architecture but not COIMax) | classification system 1500 (used six-crop architecture and COIMax) |
|---|---|---|---|
| scratch miss rate | 1.89% | 1.42% | 0.47% |
| scratch miss rate after using LRT | 1.42% | 0.47% | 0.00% |
| arrow miss rate | 2.40% | 3.20% | 2.40% |
| arrow miss rate after using LRT | 2.40% | 2.40% | 1.60% |

*the threshold of LRT is 0.5

TABLE 3

|  | classification system 1 (multi-crop architecture and COIMax not used) | classification system 2 (used a six-crop architecture but not COIMax) | classification system 1500 (used six-crop architecture and COIMax) |
|---|---|---|---|
| overall error rate | 3.00% | 2.85% | 3.30% |
| overall error rate after using LRT | 3.15% | 3.00% | 3.50% |
| scratch miss rate | 2.61% | 3.04% | 2.61% |
| scratch miss rate after using LRT | 2.17% | 2.61% | 1.74% |
| arrow miss rate | 4.10% | 4.10% | 2.46% |
| arrow miss rate after using LRT | 4.10% | 4.10% | 2.46% |

*the threshold of LRT is 0.5

As may be seen from Tables 2 and 3, the classification system 1500 using the class-of-interest maximum fusion method of the disclosure significantly reduces the miss rate of the class-of-interest (i.e.: scratch, arrow).

Tables 4 and 5 show the performance comparisons (i.e. class-wise predictive precision rate of the first class-of-interest) of the classification systems (e.g.: classification system 1300 or classification system 1500) using the class-of-interest minimum fusion method (COIMin Fusion) of the disclosure and other classification systems (i.e.: classification system C and classification system D) on the data sets from Table 1, wherein the data sets used in Table 4 are the verification sets in Table 1, and the data sets used in Table 5 are the test sets in Table 1. In Tables 4 and 5, the first class-of-interest is the particle on the appearance of the DRAM.

TABLE 4

|  | classification system C (multi-crop architecture and COIMin not used) | classification system D (used six-crop architecture but not COIMin) | classification system 1300 (used six-crop architecture and COIMin) |
|---|---|---|---|
| overall error rate | 2.65% | 2.65% | 3.85% |
| overall error rate adjusted by chance threshold | 5.05% | 4.95% | 6.25% |
| predicted precision rate | 97.95% | 98.20% | 99.16% |
| predicted precision rate after probability adjustment | 100% | 100% | 100% |

*the probability threshold is 0.95

TABLE 5

|  | classification system C (multi-crop architecture and COIMin not used) | classification system D (used six-crop architecture but not COIMin) | classification system 1300 (used six-crop architecture and COIMin) |
|---|---|---|---|
| overall error rate | 3.00% | 2.85% | 4.25% |
| overall error rate adjusted by chance threshold | 5.45% | 5.10% | 7.05% |
| predicted precision rate | 97.17% | 96.72% | 98.70% |
| predicted precision rate after probability adjustment | 99.16% | 99.17% | 99.69% |

*the probability threshold is 0.95

As may be seen from Tables 4 and 5, the classification system 1300 using the class-of-interest minimum fusion of the disclosure significantly improves the predicted precision rate of the class-of-interest (i.e.: particle).

Table 6 shows the data sets Dataset "_DS_1806228_CP_7_Defect_" associated with an appearance image of the printed circuit board. Tables 7 and 8 show the performance comparison of the classification system (e.g.: classification system 1500) using the class-of-interest maximum fusion method (COIMax Fusion) of the disclosure and another classification system (i.e.: classification system E) on the data sets from Table 6, wherein the data sets used in Table 7 are the verification sets in Table 6, and the data sets used in Table 8 are the test sets in Table 6. In Tables 7 and 8, the first class-of-interest is the white-point on the appearance of the printed circuit board, and the second class-of-interest is the exposed-copper on the appearance of the printed circuit board.

TABLE 6

Dataset "_DS_1806228_CP_7-Defect_"

| class (label) | training set | verification set | test set | total |
|---|---|---|---|---|
| board-scratch | 6287 | 1351 | 1305 | 8943 |
| white-point | 809 | 174 | 185 | 1168 |
| oxidation | 4912 | 1096 | 1108 | 7116 |
| pollution | 5573 | 1172 | 1185 | 7930 |
| exposed-copper | 2159 | 477 | 440 | 3076 |
| hole-edge-whitish | 1287 | 273 | 285 | 1845 |
| residual-powder | 2008 | 392 | 427 | 2827 |
| total | 23035 | 4935 | 4935 | 32907 |

TABLE 7

|  | classification system E (multi-crop architecture and COIMax not used) | classification system 1500 (used six-crop architecture and COIMax) |
|---|---|---|
| overall error rate | 1.95% | 2.27% |
| overall error rate after using LRT | 2.11% | 2.37% |
| white-point miss rate | 16.27% | 14.46% |
| white-point miss rate after using LRT | 14.46% | 12.65% |
| exposed-copper miss rate | 5.89% | 4.84% |
| exposed-copper miss rate after using LRT | 4.63% | 4.00% |

*the threshold of LRT is 0.5

TABLE 8

| | classification system E (multi-crop architecture and COIMax not used) | classification system 1500 (used six-crop architecture and COIMax) |
|---|---|---|
| overall error rate | 2.61% | 2.63% |
| overall error rate after using LRT | 2.61% | 2.90% |
| white-point miss rate | 22.28% | 16.85% |
| white-point miss rate after using LRT | 14.67% | 14.13% |
| exposed-copper miss rate | 5.70% | 3.73% |
| exposed-copper miss rate after using LRT | 3.95% | 3.07% |

*the threshold of LRT is 0.5

As may be seen from Tables 7 and 8, the classification system 1500 using the class-of-interest maximum fusion method of the disclosure significantly reduces the miss rate of the class-of-interest (i.e.: white-point, exposed-copper).

Tables 9 and 10 show the performance comparison (i.e. class-wise predictive precision rate of the first class-of-interest) of the classification system (e.g.: classification system 1300 or classification system 1500) having the class-of-interest minimum fusion (COIMin Fusion) of the disclosure and other classification system (i.e.: classification system F) on data sets from Table 6, wherein the data sets used in Table 9 are the verification sets in Table 6, and the data sets used in Table 10 are the test sets in Table 6. In Tables 9 and 10, the first class-of-interest is the white-point on the appearance of the printed circuit board.

TABLE 9

| | classification system F (multi-crop architecture and COIMin not used) | classification system 1300 (used six-crop architecture and COIMin) |
|---|---|---|
| overall error rate | 1.95% | 2.86% |
| predicted precision rate | 87.97% | 92.08% |

TABLE 10

| | classification system F (multi-crop architecture and COIMin not used) | classification system 1300 (used six-crop architecture and COIMin) |
|---|---|---|
| overall error rate | 2.61% | 3.36% |
| predicted precision rate | 84.62% | 92.31% |

As may be seen from Tables 9 and 10, the classification system 1300 using the disclosed class-of-interest minimum fusion significantly improves the predicted precision rate of the class-of-interest (i.e.: white-point).

In summary, the classifier of the disclosure may improve the miss rate of the class-of-interest (e.g.: class with significant defects) to prevent the influx of products with significant defects into the market. In addition, for less influential defects, the classifier may improve the predicted precision rate of the defect, thereby reducing the number of samples that need to be re-examined. As a result, disclosure may significantly reduce the human resources used for product re-inspection on the production line without affecting product yield, enabling companies to invest their savings in other projects that are difficult to automate, thereby increasing the productivity of the company. When applied to a classification system based on the neural network, the classification method of the disclosure only needs to add the class-of-interest maximum/minimum fusion (COIM-Fusion) mechanism to the output of the neural network, that is, it does not need to be re-trained the trained neural network. Furthermore, the class-of-interest maximum/minimum fusion may be completed in a One Forward Inference. In other words, compared to the neural network that retrains the classification system or uses a plurality of forward inferences for the neural network, the amount of computation added by the classification method of the disclosure is very small.

Although the disclosure has been disclosed in the above embodiments, it is not intended to limit the disclosure, and any person having ordinary knowledge in the art may make some changes and refinements without departing from the spirit and scope of the disclosure. The scope of protection of the disclosure is subject to the definition of the scope of the patent application.

What is claimed is:

1. A fusion-based classifier, the classifier comprising:
   a storage medium, stores a plurality of modules; and
   a processor, coupled to the storage medium, wherein the processor accesses and executes the plurality of modules, wherein the plurality of modules comprise:
   a sub-classifier, generating a plurality of probability vectors according to input data, wherein each of the plurality of probability vectors comprises a plurality of elements respectively corresponding to a plurality of classes;
   a fusion layer, selecting a first probability vector having a first class element corresponding to a first class-of-interest from the plurality of probability vectors according to the first class-of-interest, wherein the first class element has an extremum value between a plurality of first class elements corresponding to the plurality of probability vectors respectively, wherein the plurality of first class elements corresponding to the first class-of-interest; and
   an output layer, determining a class of the input data according to the first probability vector.

2. The classifier according to claim 1, wherein the fusion layer, further selects from the plurality of probability vectors, a second probability vector having a second extremum value corresponding to a second class-of-interest according to the second class-of-interest, and the plurality of modules further comprising:
   a second fusion layer performs probability fusion on the first probability vector and the second probability vector to generate a third probability vector.

3. The classifier according to claim 2, wherein determining the class of the input data according to the first probability vector, comprising:
   determining the class of the input data according to the third probability vector.

4. The classifier according to claim 1, wherein the first class-of-interest corresponds to one of the plurality of elements, and the extremum value represents one of a maximum value and a minimum value.

5. The classifier according to claim 2, wherein the first class-of-interest corresponds to one of the plurality of elements, and the second class-of-interest corresponds to another one of the plurality of elements, and the extremum value represents one of a maximum value and a minimum value.

6. The classifier according to claim 1, wherein determining the class of the input data according to the first probability vector, comprising:
performing a likelihood ratio test on the first probability vector according to the first class-of-interest, and determining the class of the input data according to a result of the likelihood ratio test.

7. The classifier according to claim 1, wherein determining the class of the input data according to the first probability vector, comprising:
determining the class of the input data according to a threshold corresponding to the first class-of-interest.

8. The classifier according to claim 3, wherein determining the class of the input data according to the third probability vector, comprising:
performing a likelihood ratio test on the third probability vector according to the first class-of-interest and the second class-of-interest, and determining the class of the input data according to a result of the likelihood ratio test.

9. The classifier according to claim 3, wherein determining the class of the input data according to the third probability vector, comprising:
determining the class of the input data according to a first threshold corresponding to the first class-of-interest and a second threshold corresponding to the second class-of-interest.

10. The classifier according to claim 1, wherein the input data comprises a plurality of cropped parts of a feature map output from a convolution neural network.

11. A classification method based on probability fusion, the classification method comprising:
generating a plurality of probability vectors according to input data, wherein each of the plurality of probability vectors comprises a plurality of elements respectively corresponding to a plurality of classes;
selecting a first probability vector having a first class element corresponding to a first class-of-interest from the plurality of probability vectors according to the first class-of-interest, wherein the first class element has an extremum value between a plurality of first class elements corresponding to the plurality of probability vectors respectively, wherein the plurality of first class elements corresponding to the first class-of-interest;
determining a class of the input data according to the first probability vector.

12. The classification method according to claim 11, comprising:
selecting a second probability vector having a second extremum value corresponding to a second class-of-interest from the plurality of probability vectors according to the second class-of-interest, and performing the probability fusion on the first probability vector and the second probability vector to generate a third probability vector.

13. The classification method according to claim 12, comprising:
determining the class of the input data according to the third probability vector.

14. The classification method according to claim 11, wherein the first class-of-interest corresponds to one of the plurality of elements, and the extremum value represents one of a maximum value and a minimum value.

15. The classification method according to claim 12, wherein the first class-of-interest corresponds to one of the plurality of elements, and the second class-of-interest corresponds to another one of the plurality of elements, and the extremum value represents one of a maximum value and a minimum value.

16. The classification method according to claim 11, wherein determining the class of the input data according to the first probability vector, comprising:
performing a likelihood ratio test on the first probability vector according to the first class-of-interest, and determining the class of the input data according to a result of the likelihood ratio test.

17. The classification method according to claim 11, wherein determining the class of the input data according to the first probability vector, comprising:
determining the class of the input data according to a threshold corresponding to the first class-of-interest.

18. The classification method according to claim 13, wherein determining the class of the input data according to the third probability vector, comprising:
performing a likelihood ratio test on the third probability vector according to the first class-of-interest and the second class-of-interest, and determining the class of the input data according to a result of the likelihood ratio test.

19. The classification method according to claim 13, wherein determining the class of the input data according to the third probability vector, comprising:
determining the class of the input data according to a first threshold corresponding to the first class-of-interest and a second threshold corresponding to the second class-of-interest.

20. The classification method according to claim 11, wherein the input data comprises a plurality of cropped parts of a feature map output from a convolution neural network.

21. A classification system based on probability fusion, the classification system comprising:
an automatic optical inspection equipment, obtaining image data of an article; and
a processor, configured to control:
a classifier, comprising:
a sub-classifier, generating a plurality of probability vectors according to the image data, wherein each of the plurality of probability vectors comprises a plurality of elements respectively corresponding to a plurality of classes;
a fusion layer, selecting a first probability vector having a first class element corresponding to a first class-of-interest from the plurality of probability vectors according to the first class-of-interest, wherein the first class element has an extremum value between a plurality of first class elements corresponding to the plurality of probability vectors respectively, wherein the plurality of first class elements corresponding to the first class-of-interest;
an output layer, determining a class of an appearance defect according to the first probability vector.

* * * * *